US011551489B1

(12) United States Patent
Rejeti et al.

(10) Patent No.: US 11,551,489 B1
(45) Date of Patent: Jan. 10, 2023

(54) METHODS AND SYSTEMS FOR COOLANT SYSTEM DIAGNOSTICS

(71) Applicant: Ford Global Technologies, LLC, Dearborn, MI (US)

(72) Inventors: Sitaram Rejeti, Farmington, MI (US); Adam Krach, Canton, MI (US); Robert Roy Jentz, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/455,189

(22) Filed: Nov. 16, 2021

(51) Int. Cl.
*G07C 5/08* (2006.01)
*F01P 5/10* (2006.01)
*F02D 29/00* (2006.01)
*F01P 3/20* (2006.01)
*B60H 1/00* (2006.01)
*B60H 1/08* (2006.01)

(52) U.S. Cl.
CPC ....... *G07C 5/0808* (2013.01); *B60H 1/00978* (2013.01); *F01P 3/20* (2013.01); *F01P 5/10* (2013.01); *F02D 29/00* (2013.01); *B60H 1/08* (2013.01); *F01P 2005/105* (2013.01); *F01P 2025/13* (2013.01); *F01P 2060/08* (2013.01); *F02D 2200/70* (2013.01)

(58) Field of Classification Search
CPC ........... F01P 5/10; F01P 3/20; B60H 1/00978; G07C 5/0808
See application file for complete search history.

(56) References Cited

U.S. PATENT DOCUMENTS

| 8,689,617 | B2 | 4/2014 | Rollinger et al. |
| 8,813,692 | B2 | 8/2014 | Bialas et al. |
| 9,222,398 | B2 | 12/2015 | Mehring et al. |
| 2010/0018962 | A1* | 1/2010 | Kabasin ................. G05D 23/24 219/482 |
| 2011/0120216 | A1* | 5/2011 | Sugimoto ........... G01M 15/042 73/114.68 |
| 2014/0027089 | A1* | 1/2014 | Hisada .................. B60L 3/0061 165/11.1 |
| 2014/0052411 | A1* | 2/2014 | Skelton ................... B60L 50/16 702/183 |
| 2019/0181476 | A1* | 6/2019 | Jeong ................ H01M 8/04358 |
| 2020/0384845 | A1 | 12/2020 | Kalivarapu et al. |
| 2021/0040911 | A1 | 2/2021 | Rejeti et al. |

* cited by examiner

*Primary Examiner* — Kevin A Lathers
(74) *Attorney, Agent, or Firm* — Vincent Mastrogiacomo; McCoy Russell LP

(57) ABSTRACT

Methods and systems are provided for a coolant system. In one example, a method may include diagnosing a condition of a pump of the coolant system based on a temperature change of coolant. The diagnostic may determine if the pump is stuck on or off.

20 Claims, 10 Drawing Sheets

METHODS AND SYSTEMS FOR COOLANT SYSTEM DIAGNOSTICS

FIELD

The present description relates generally to diagnosing coolant pump conditions.

BACKGROUND/SUMMARY

Engine controls may include on-board diagnosis of various engine components or sensors, particularly when improper operation of such component or sensors can adversely influence various aspects of engine operation and/or emissions. For example, desired operation of an engine coolant system may be determined via diagnosis of whether a coolant pump is operating as desired (e.g., not stuck on or off).

Previous examples of determining proper operation of the coolant pump may include where a chip is arranged on a side of an actuator. The chip may be configured to determine various modes of the pump operation including a dry run, a stuck/stalled impeller, over temperature, over/under voltage, other electrical error, and the like.

However, the inventors have identified some issues with the approaches described above. For example, as a greater number of vehicles become at least partially electrified, chip shortages may be further exacerbated. This may lead to further increased costs to include the chip, while also increasing manufacturing delays.

In one example, the issues described above may be addressed by a method including diagnosing a coolant pump based on only a temperature change of a coolant across a heater core. In this way, the chip may be omitted while diagnostics of the pump may still be executed.

As one example, the diagnostic may be intrusively executed during a condition where the engine is unfueled. In one example, the temperature change may be measured across two or more temperature sensors including a temperature sensor of an engine and a temperature sensor downstream of a heat exchanger, such as a coolant heater and/or a heater core. Conditions for the diagnostic may further include conditions where cabin heating may be desired, which may coincide when ambient temperatures are less than a threshold ambient temperature. The diagnostic may allow manufacturers to omit an application-specific integrated circuit (ASIC) chip from the pump. By doing this, manufacturing times and costs may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for diagnosing a condition of a coolant system. In one example, the coolant system diagnostics are configured to determine the condition of a pump. In one example, the pump is an auxiliary pump, wherein the coolant system further includes a main pump. In other examples, the pump may be the only pump of the coolant system. The diagnostics may determine a stuck on or a stuck off position of the pump, along with a desired operating condition of the pump. The pump may be arranged in a vehicle system, such as the vehicle system shown in FIG. 1.

Figure 2:
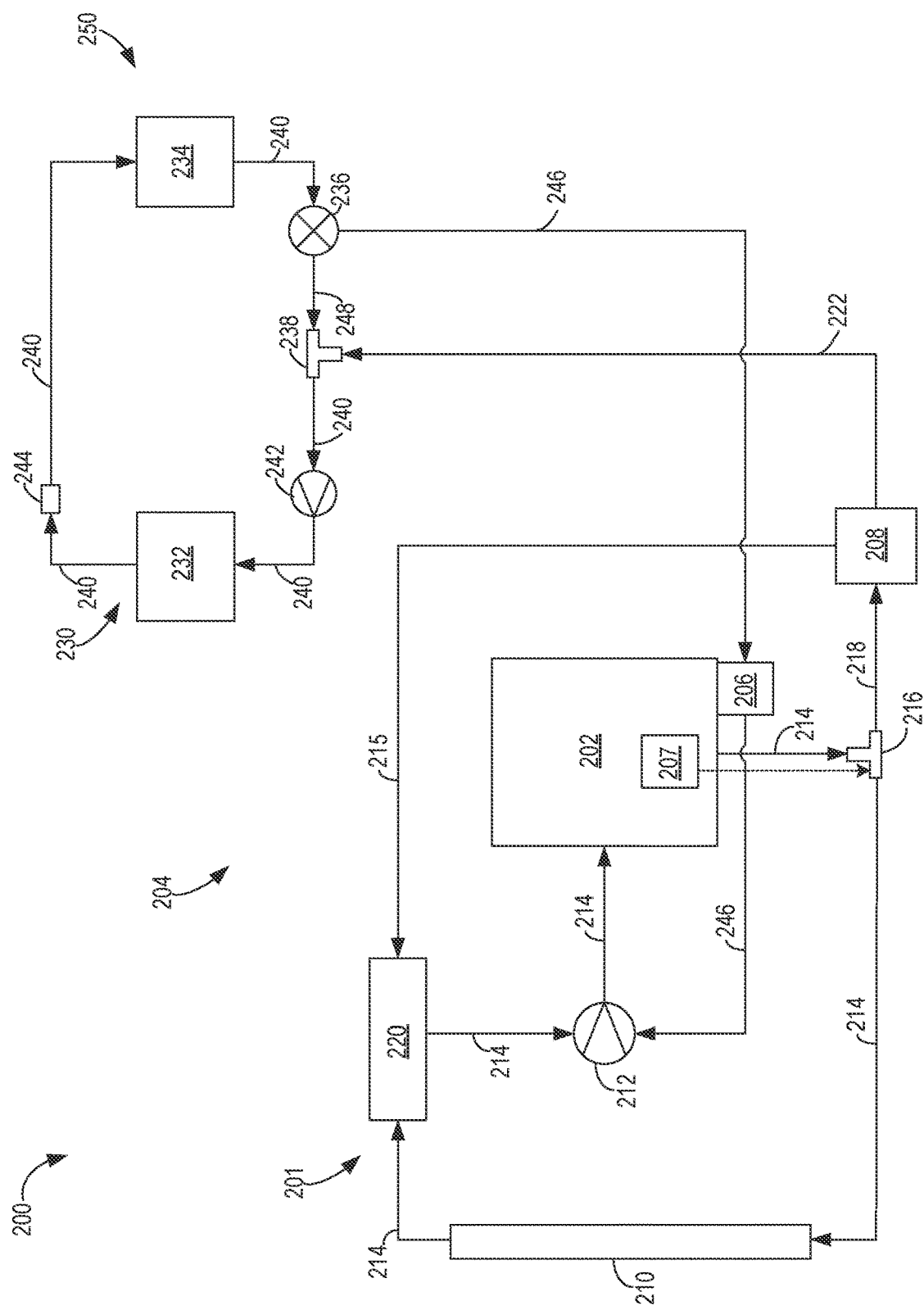
FIG. 2 shows a first example of a coolant system of the hybrid vehicle including a primary cooling loop and a secondary cooling loop.
Figure 3:
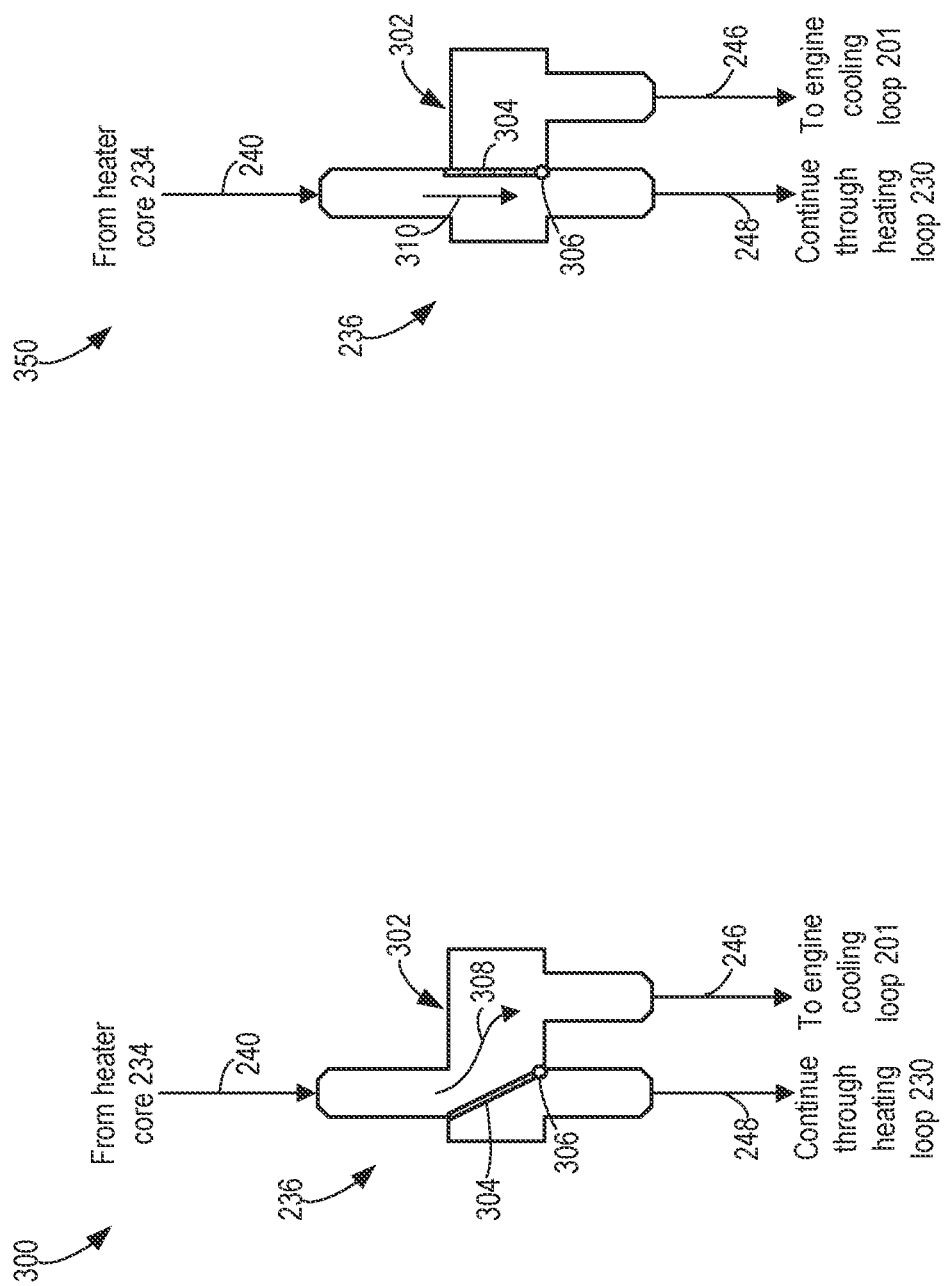
FIGS. 3A and 3B show example positions of a valve of the coolant system of FIG. 2.
Figure 4:
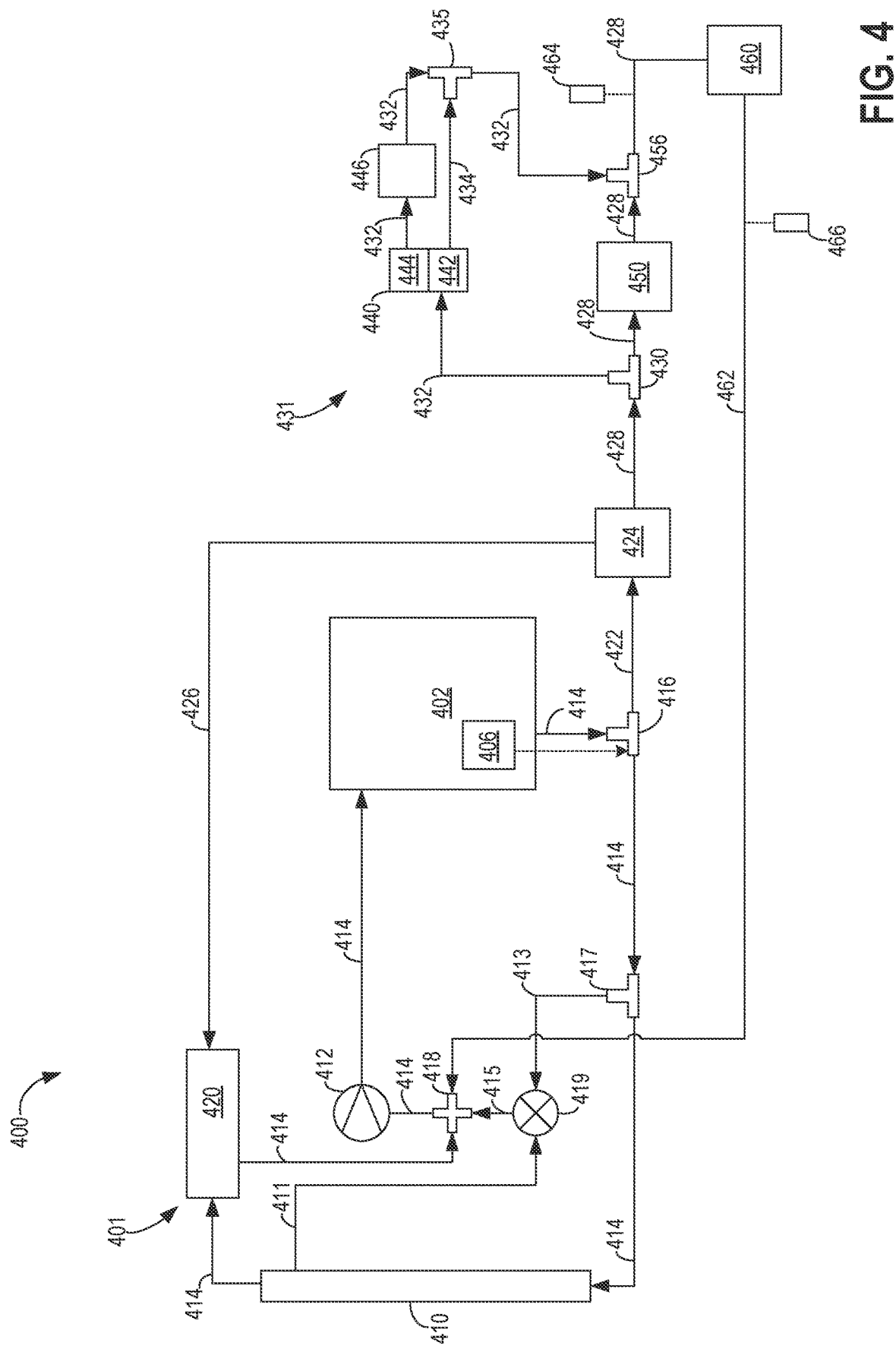
FIG. 4 shows a second example of a coolant system of the hybrid vehicle including only one cooling loop.
Figure 5A:
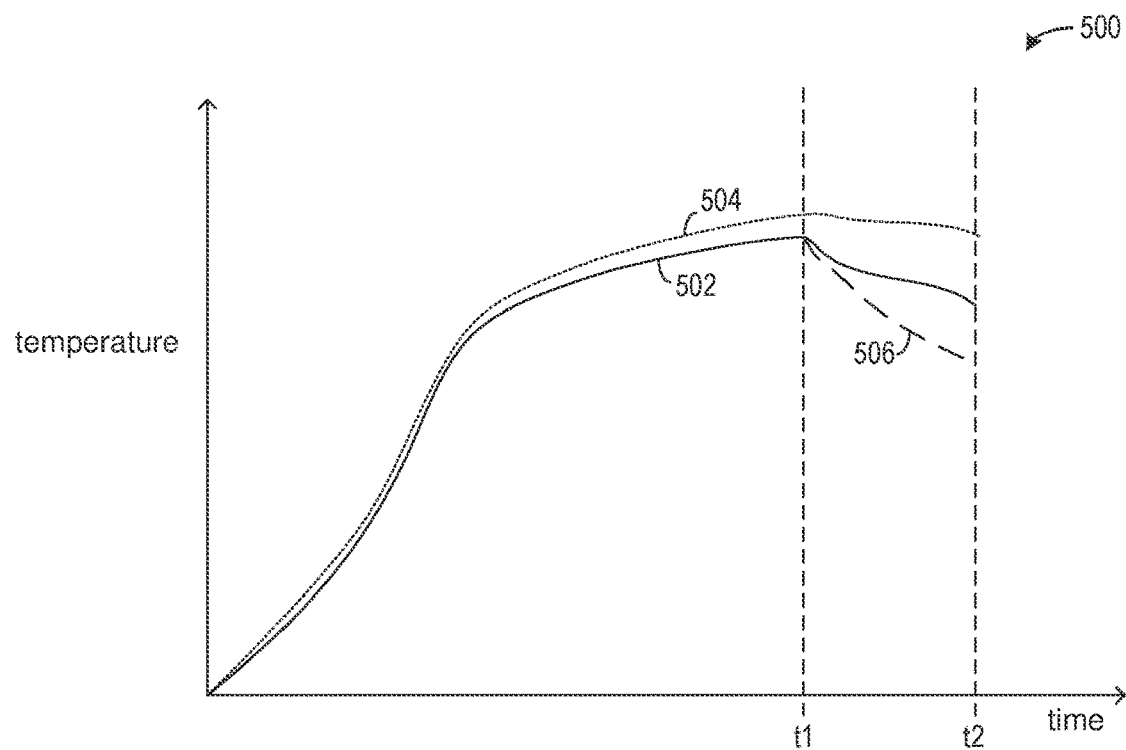
FIGS. 5A and 5B show temperature changes of coolant based on a pump condition of the second example and the first example, respectively.
Figure 5B:
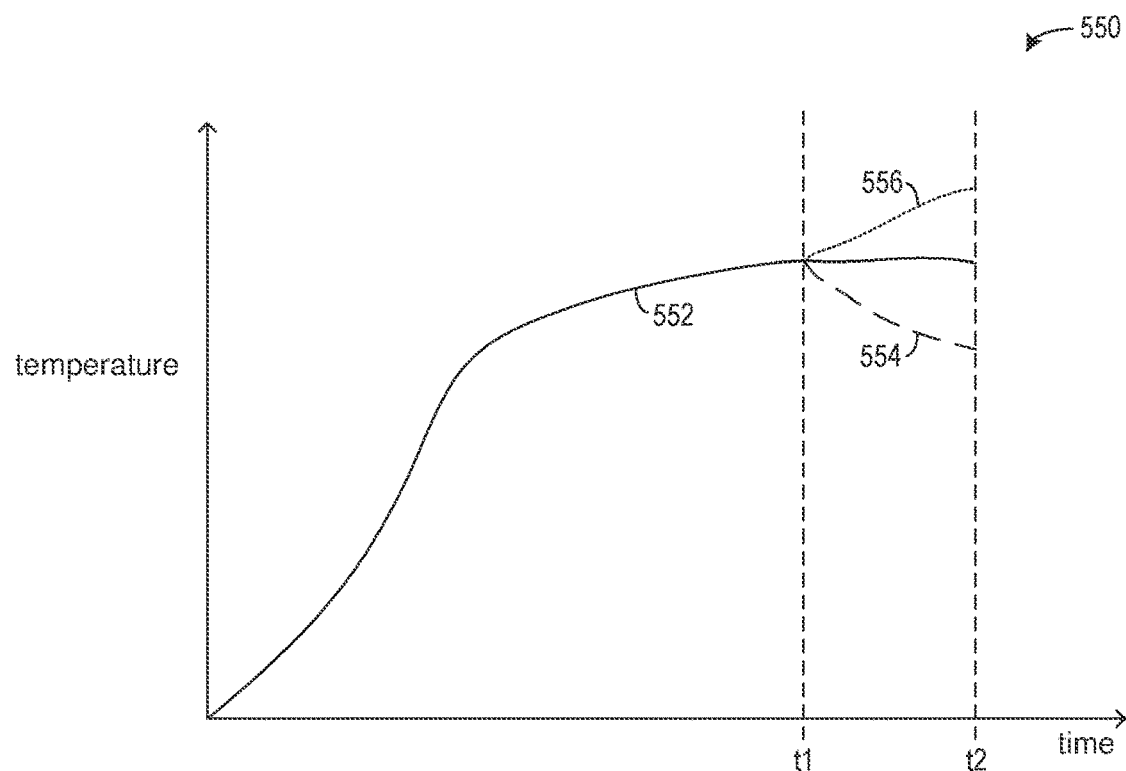
Figure 5C:
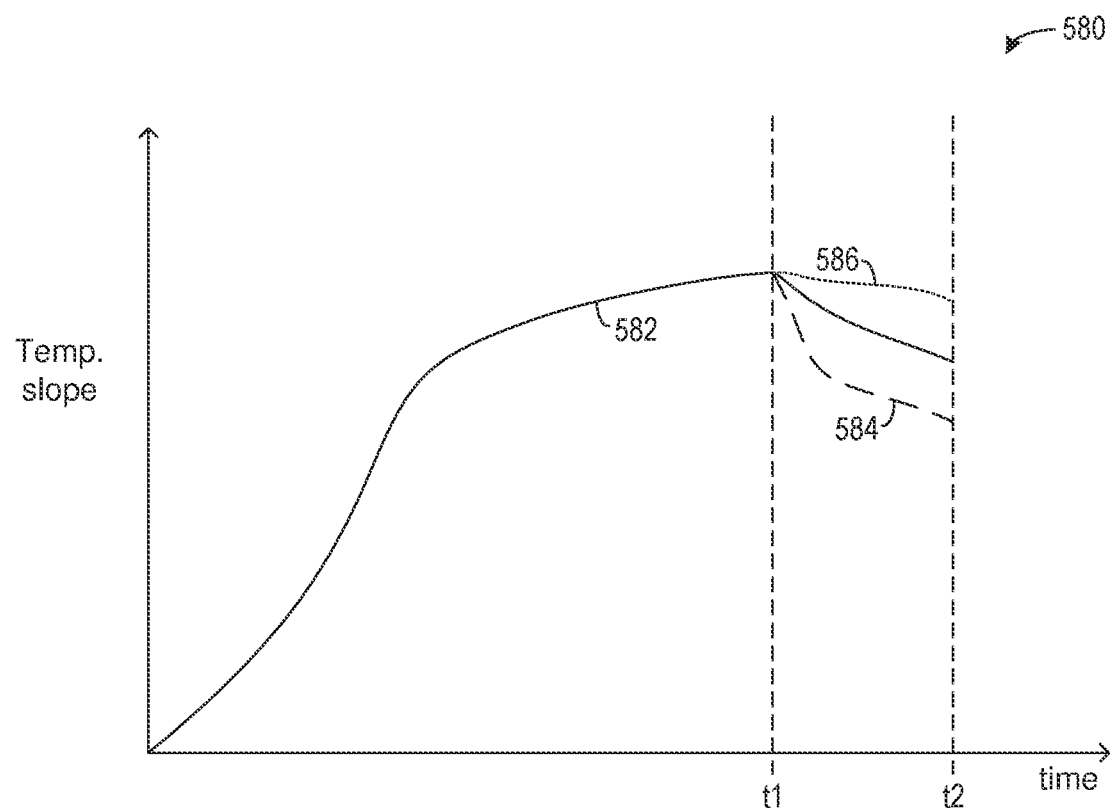
FIG. 5C shows a temperature change of coolant common to each of the diagnostic methodologies of the present disclosure.

The vehicle system may include an engine fluidly coupled to the coolant system. A first example of the coolant system is illustrated in FIGS. 2, 3A, and 3B. A second example of the coolant system is illustrated in FIG. 4. Coolant temperature changes based on different conditions of the pump of the second example of the coolant system are shown in FIG. 5A. Coolant temperature changes based on different conditions of the pump of the first example of the coolant system are shown in FIG. 5B. Coolant temperature changes applicable to pump diagnostics for gas, diesel, and hybrid vehicles is shown in FIG. 5C.

Figure 6:
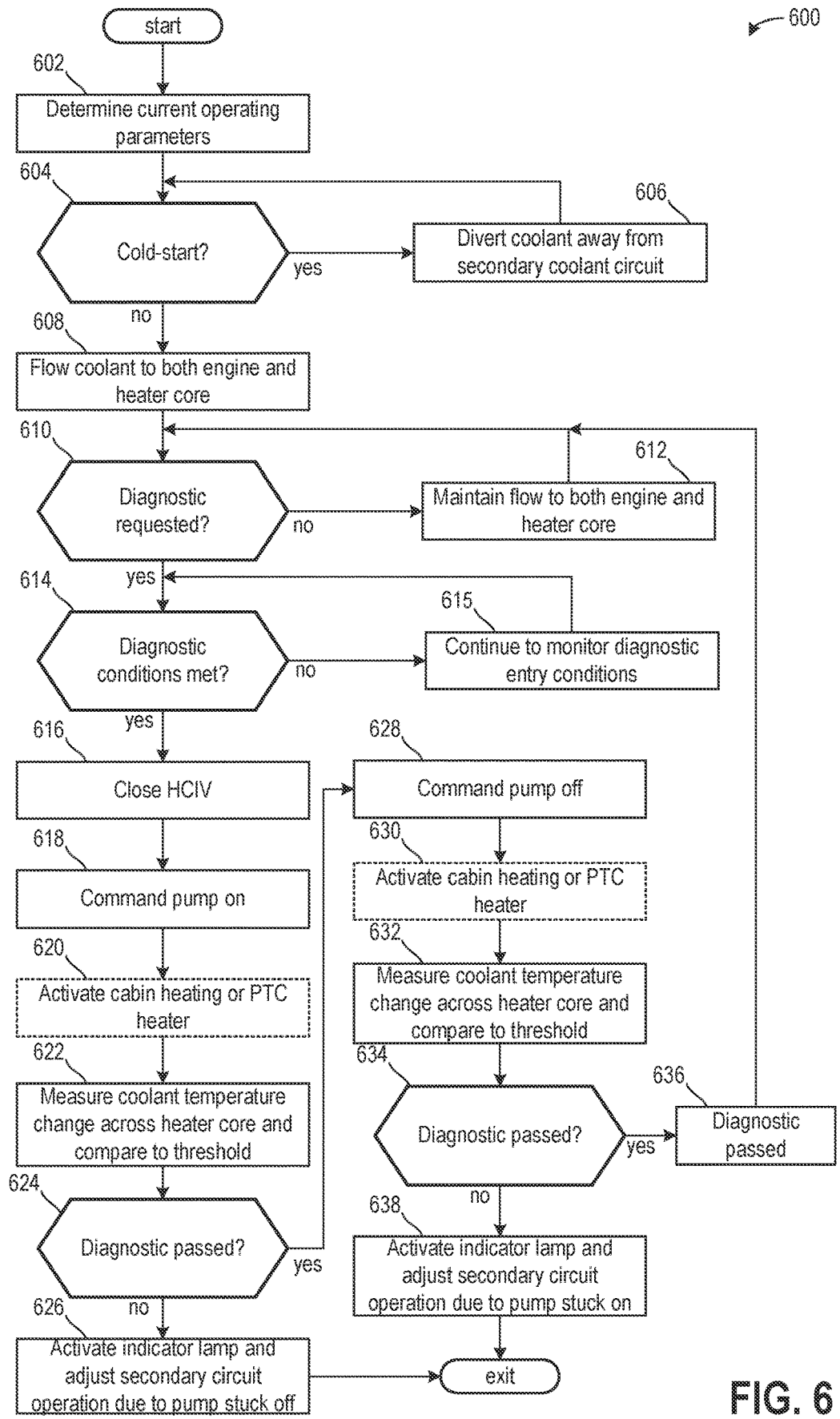
FIGS. 6 and 7 show methods for executing a coolant system diagnostic for a non-hybrid vehicle of FHEV.
Figure 7:
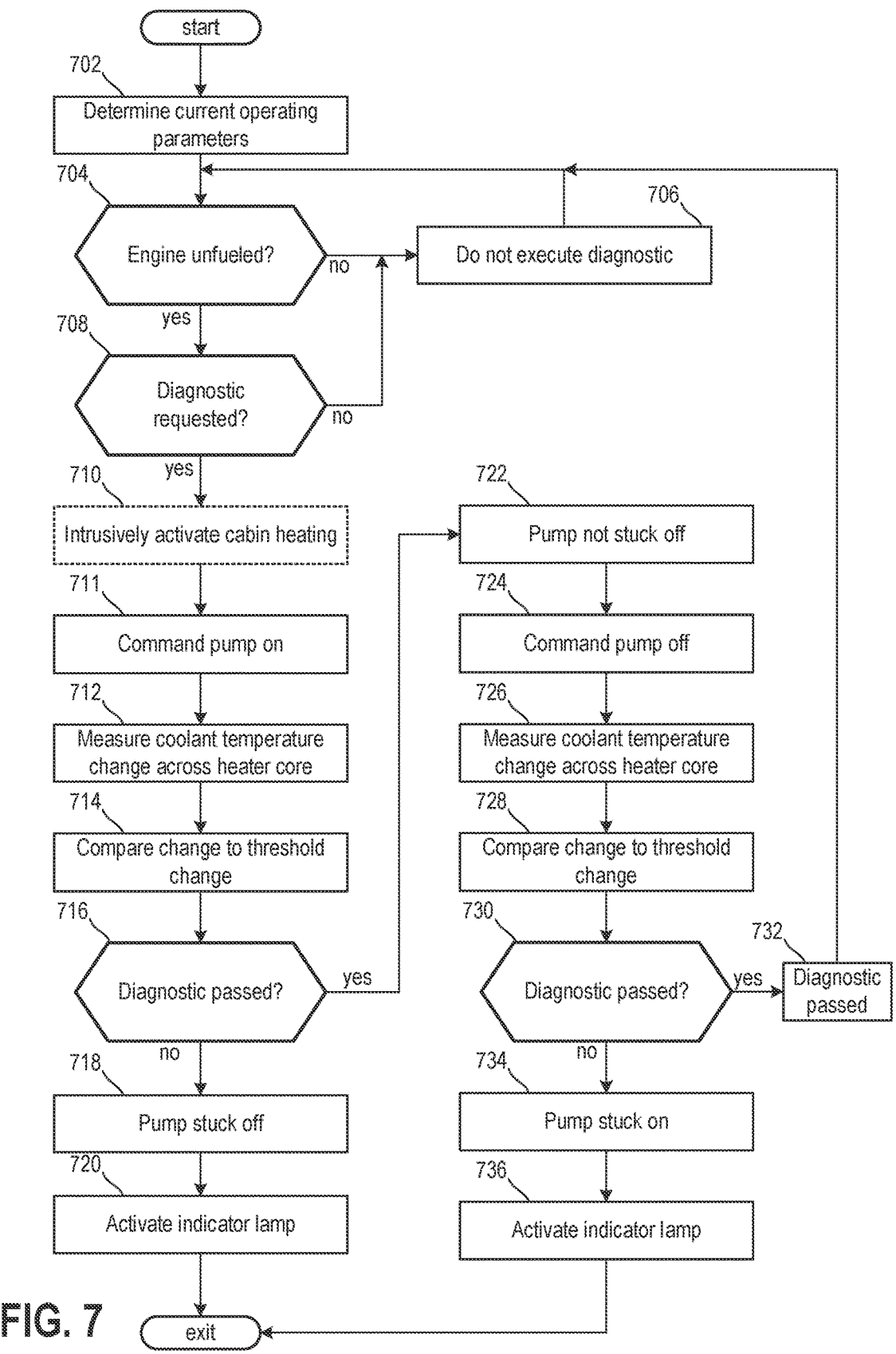
Figure 8:
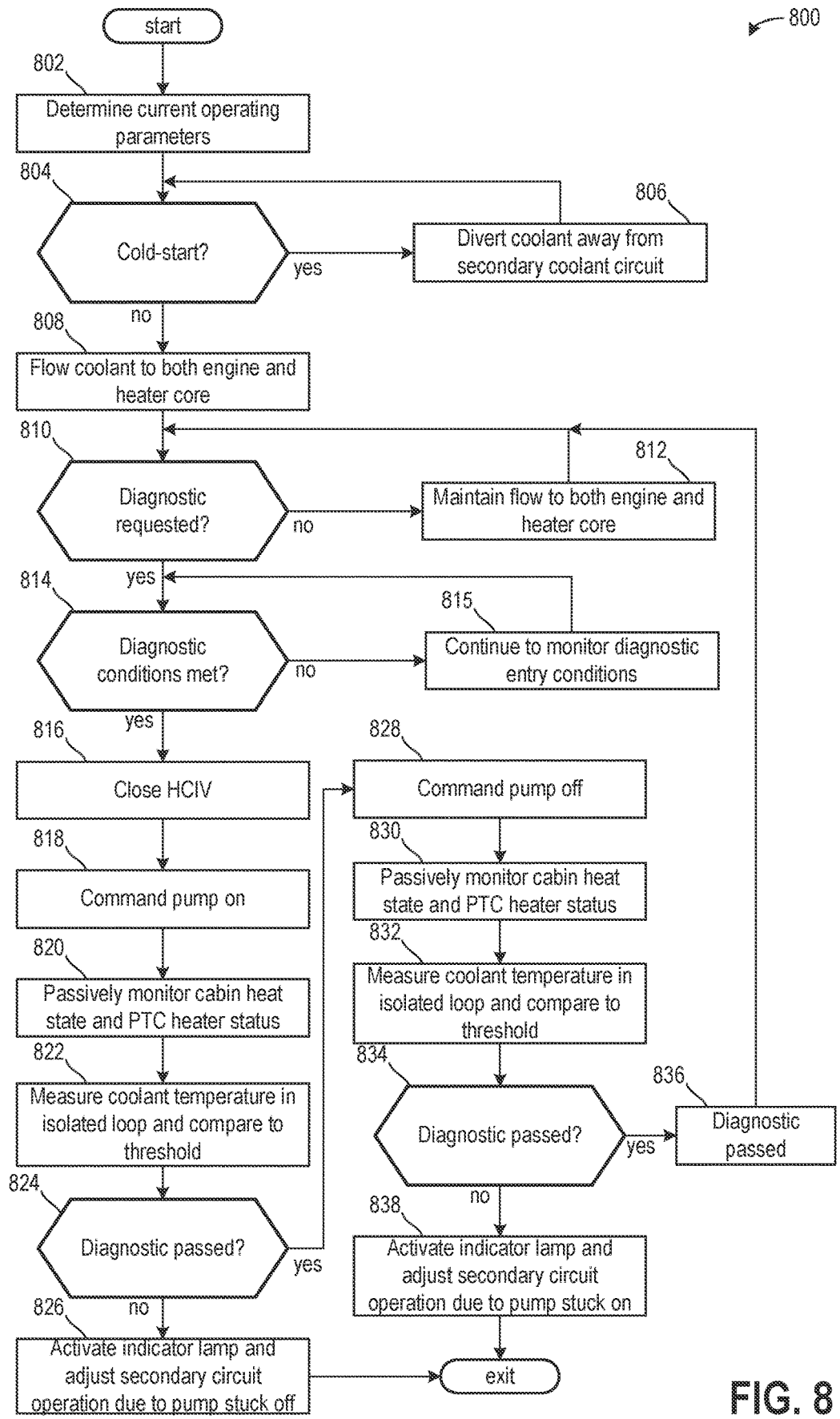
FIGS. 8 and 9. show methods for executing a coolant system diagnostic for a PHEV.
Figure 9:
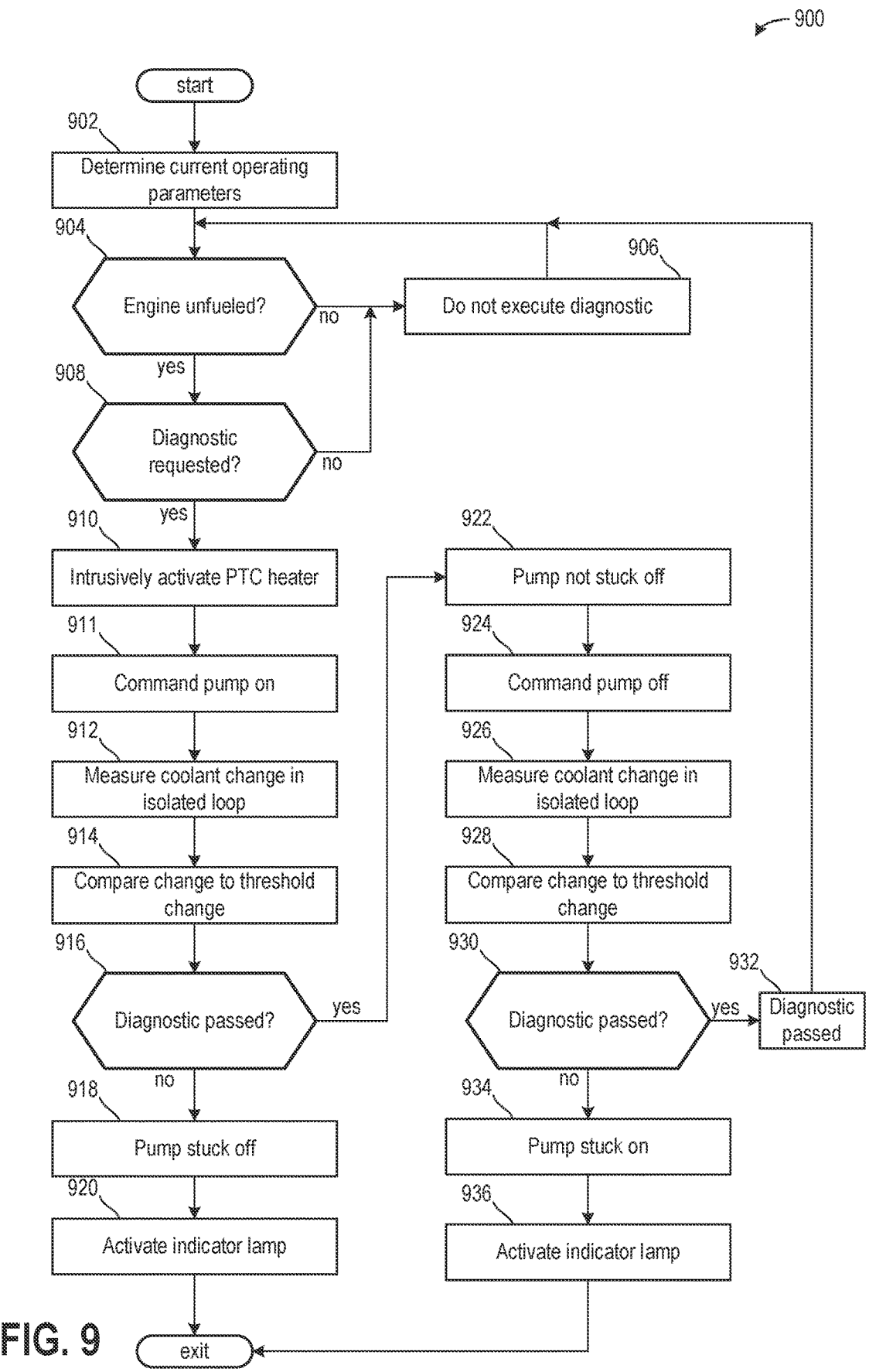

Methods for executing the diagnostic in a non-hybrid or FHEV are shown in FIGS. 6 and 7. Methods for executing the diagnostic in a PHEV are shown in FIGS. 8 and 9.

FIGS. 1-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Figure 1:
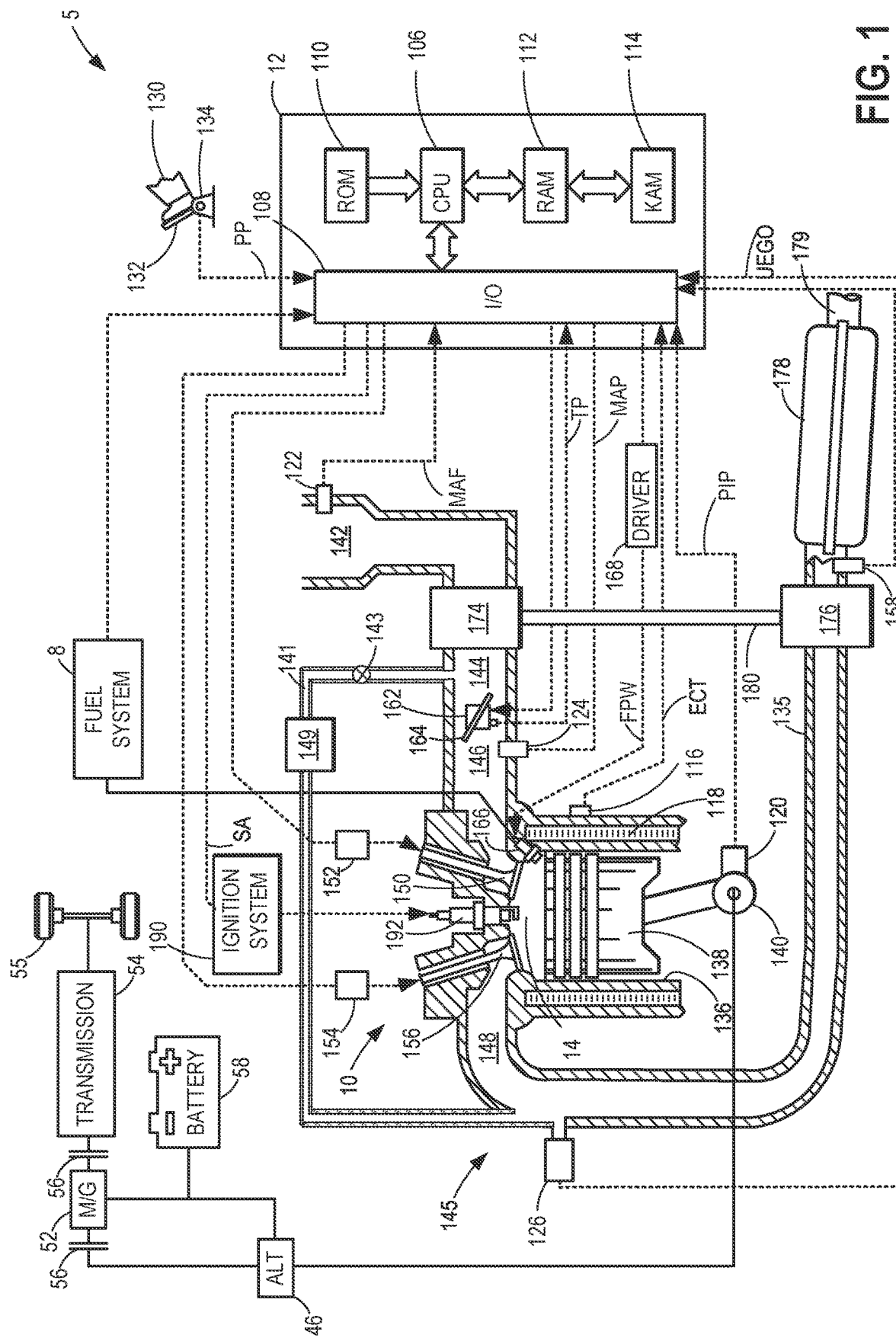
FIG. 1 shows a schematic of an engine included in a hybrid vehicle.

Turning now to the figures, FIG. 1 depicts an example of a cylinder 14 of an internal combustion engine 10, which may be included in a vehicle 5. Engine 10 may be controlled at least partially by a control system, including a controller 12, and by input from a vehicle operator 130 via an input device 132. In this example, input device 132 includes an accelerator pedal and a pedal position sensor 134 for generating a proportional pedal position signal PP. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one vehicle wheel 55 via a transmission 54, as further described below. Further, a starter motor (not shown) may be coupled to crankshaft 140 via a flywheel to enable a starting operation of engine 10.

Cylinder 14 may be cooled by a cooling sleeve 118 that circumferentially surrounds cylinder 14 and flows a coolant there through. The cooling sleeve 118 may be included in a coolant system that circulates coolant through various components of the engine 10 to provide cooling and heat exchange and may regulate engine temperature and utilization of waste heat. A temperature sensor 116 may be coupled to the cooling sleeve 118 or a cylinder head. A temperature of coolant exiting the engine cylinders may be estimated based on input from the temperature sensor 116. An engine coolant loop may include an engine cooling loop and a cabin heating loop. In some examples, a heater core isolation valve (HCIV) may be positioned to seal the cabin heating loop from the engine cooling loop during some conditions.

In some examples, vehicle 5 may be a hybrid vehicle, such as a plug-in hybrid electric vehicle (PHEV) or a full hybrid electric vehicle (FHEV), with multiple sources of torque available to one or more vehicle wheels 55. In other examples, vehicle 5 is a conventional vehicle with only an engine or an electric vehicle with only an electric machine(s). In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission.

The powertrain may be configured in various manners, including as a parallel, a series, or a series-parallel hybrid vehicle. In electric vehicle embodiments, a system battery 58 may be a traction battery that delivers electrical power to electric machine 52 to provide torque to vehicle wheels 55. In some embodiments, electric machine 52 may also be operated as a generator to provide electrical power to charge system battery 58, for example, during a braking operation. It will be appreciated that in other embodiments, including non-electric vehicle embodiments, system battery 58 may be a typical starting, lighting, ignition (SLI) battery coupled to an alternator 46.

Alternator 46 may be configured to charge system battery 58 using engine torque via crankshaft 140 during engine running. In addition, alternator 46 may power one or more electrical systems of the engine, such as one or more auxiliary systems including a heating, ventilation, and air conditioning (HVAC) system, vehicle lights, an on-board entertainment system, and other auxiliary systems based on their corresponding electrical demands. In one example, a current drawn on the alternator may continually vary based on each of an operator cabin cooling demand, a battery charging requirement, other auxiliary vehicle system demands, and motor torque. A voltage regulator may be coupled to alternator 46 in order to regulate the power output of the alternator based upon system usage requirements, including auxiliary system demands.

Cylinder 14 of engine 10 can receive intake air via a series of intake passages 142 and 144 and an intake manifold 146. Intake manifold 146 can communicate with other cylinders of engine 10 in addition to cylinder 14. One or more of the intake passages may include one or more boosting devices, such as a turbocharger or a supercharger. For example, FIG. 1 shows engine 10 configured with a turbocharger, including a compressor 174 arranged between intake passages 142 and 144 and an exhaust turbine 176 arranged along an exhaust passage 135. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from a motor or the engine and exhaust turbine 176 may be optionally omitted.

A throttle 162 including a throttle plate 164 may be provided in the engine intake passages for varying the flow rate and/or pressure of intake air provided to the engine cylinders. For example, throttle 162 may be positioned downstream of compressor 174, as shown in FIG. 1, or may be alternatively provided upstream of compressor 174.

An exhaust system 145 is coupled to cylinder 14 via a poppet valve 156. The exhaust system includes an exhaust manifold 148, an emission control device 178, and exhaust tail pipe 179. Exhaust manifold 148 can receive exhaust gases from other cylinders of engine 10 in addition to cylinder 14. An exhaust gas sensor 126 is shown coupled to exhaust manifold 148 upstream of an emission control device 178. Exhaust gas sensor 126 may be selected from among various suitable sensors for providing an indication of an exhaust gas air/fuel ratio (AFR), such as a linear oxygen sensor or UEGO (universal or wide-range exhaust gas oxygen), a two-state oxygen sensor or EGO, a HEGO (heated EGO), a NOx, a HC, or a CO sensor, for example. In the example of FIG. 1, exhaust gas sensor 126 is a UEGO. Emission control device 178 may be a three-way catalyst, a NOx trap, various other emission control devices, or combinations thereof.

Engine 10 may further include one or more exhaust gas recirculation passages for recirculating a portion of exhaust gas from the engine exhaust to the engine intake. As such, by recirculating some exhaust gas, an engine dilution may be affected which may enhance engine performance by reducing engine knock, peak cylinder combustion temperatures and pressures, throttling losses, and NO emissions. In the depicted embodiment, exhaust gas may be recirculated from exhaust manifold 148 to intake passage 144 via EGR passage 141. The amount of EGR provided to intake passage 144 may be varied by controller 12 via EGR valve 143. In other examples, engine 10 may be configured to also provide low pressure EGR (not shown in FIG. 1) being provided via an LP-EGR passage coupled between the engine intake upstream of the turbocharger compressor 174 and the engine exhaust downstream of the turbine 176.

Furthermore, when the engine 10 is operating and generating exhaust gas, heat from the EGR gases may be extracted through an EGR cooler 149, arranged in the EGR passage 141 in a path of gas flow. The EGR cooler 149 may be a heat exchanger, utilizing cooling by air-to-liquid heat exchange, as an example. Coolant may flow through the EGR cooler 149, absorbing heat from the hot gases and flowing to a heater core where the heat is extracted from the coolant via liquid-to-air heat exchange and directed to a passenger cabin to heat the cabin. Heat transfer between the EGR gases and an engine coolant system is described further below with reference to FIG. 2. It will be appreciated that while the EGR cooler 149 is shown in FIG. 1 upstream of the EGR valve 143, other examples may include the EGR cooler 149 arranged downstream of the EGR valve 143 or in another region of the EGR passage 141.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. Intake valve 150 may be controlled by controller 12 via an actuator 152. Similarly, exhaust valve 156 may be controlled by controller 12 via an actuator 154. The positions of intake valve 150 and exhaust valve 156 may be determined by respective valve position sensors (not shown).

During some conditions, controller 12 may vary the signals provided to actuators 152 and 154 to control the opening and closing of the respective intake and exhaust valves. The valve actuators may be of an electric valve actuation type, a cam actuation type, or a combination thereof. The intake and exhaust valve timing may be controlled concurrently, or any of a possibility of variable intake cam timing, variable exhaust cam timing, dual independent variable cam timing, or fixed cam timing may be used.

Cylinder 14 can have a compression ratio, which is a ratio of volumes when piston 138 is at bottom dead center (BDC) to top dead center (TDC). In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

Each cylinder of engine 10 may include a spark plug 192 for initiating combustion. An ignition system 190 can provide an ignition spark to combustion chamber 14 via spark plug 192 in response to a spark advance signal SA from controller 12, under select operating modes. A timing of signal SA may be adjusted based on engine operating conditions and driver torque demand. For example, spark may be provided at maximum brake torque (MBT) timing to maximize engine power and efficiency. Controller 12 may input engine operating conditions, including engine speed, engine load, and exhaust gas AFR, into a look-up table and output the corresponding MBT timing for the input engine operating conditions. In other examples, spark may be retarded from MBT, such as to expedite catalyst warm-up during engine start or to reduce an occurrence of engine knock.

In some examples, each cylinder of engine 10 may be configured with one or more fuel injectors for providing fuel thereto. As a non-limiting example, cylinder 14 is shown including a fuel injector 166. Fuel injector 166 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to a pulse width of a signal FPW received from controller 12 via an electronic driver 168. In this manner, fuel injector 166 provides what is known as direct injection (hereafter also referred to as "DI") of fuel into cylinder 14. While FIG. 1 shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injector 166 from a fuel tank of fuel system 8 via a high pressure fuel pump and a fuel rail. Further, the fuel tank may have a pressure transducer providing a signal to controller 12.

In an alternate example, fuel injector 166 may be arranged in an intake passage rather than coupled directly to cylinder 14 in a configuration that provides what is known as port injection of fuel (hereafter also referred to as "PFI") into an intake port upstream of cylinder 14. In yet other examples, cylinder 14 may include multiple injectors, which may be configured as direct fuel injectors, port fuel injectors, or a combination thereof. As such, it should be appreciated that the fuel systems described herein should not be limited by the particular fuel injector configurations described herein by way of example.

Fuel injector 166 may be configured to receive different fuels from fuel system 8 in varying relative amounts as a fuel mixture and further configured to inject this fuel mixture directly into cylinder. Further, fuel may be delivered to cylinder 14 during different strokes of a single cycle of the cylinder. For example, directly injected fuel may be delivered at least partially during a previous exhaust stroke, during an intake stroke, and/or during a compression stroke. As such, for a single combustion event, one or multiple injections of fuel may be performed per cycle. The multiple injections may be performed during the compression stroke, intake stroke, or any appropriate combination thereof in what is referred to as split fuel injection.

Controller 12 is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including signals previously discussed and additionally including a measurement of inducted mass air flow (MAF) from a mass air flow sensor 122; an engine coolant temperature (ECT) from a temperature sensor 116 coupled to the cooling sleeve 118 or a cylinder head; an ambient temperature (AAT) from a temperature sensor coupled to the vehicle body; an exhaust gas temperature from a temperature sensor 158 coupled to exhaust passage 135; a profile ignition pickup signal (PIP) from a Hall effect sensor 120 (or other type) coupled to crankshaft 140; throttle position (TP) from a throttle position sensor; signal UEGO from exhaust gas sensor 126, which may be used by controller 12 to determine the AFR of the exhaust gas; and an absolute manifold pressure signal (MAP) from a MAP sensor 124. An engine speed signal, RPM, may be generated by controller 12 from signal PIP. The manifold pressure signal MAP from MAP sensor 124 may be used to provide an indication of vacuum or pressure in the intake manifold. Controller 12 may infer an engine temperature based on the engine coolant temperature and infer a temperature of emission control device 178 based on the signal received from temperature sensor 158.

Controller 12 receives signals from the various sensors of FIG. 1 and employs the various actuators of FIG. 1 to adjust engine operation based on the received signals and instructions stored on a memory of the controller. For example, the controller may obtain the ECT from the temperature sensor 116 and adjust a flow of coolant circulating through the cooling sleeve 118 based on the ECT. Additionally or alternatively, the controller 12 may signal to various valves and coolant pumps to adjust operation thereof to execute a coolant pump diagnostic.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

In FIG. 2, a schematic diagram of a first example of a coolant system 200 is shown. In one example, the coolant system 200 is a coolant system of a PHEV. The coolant system may be coupled to an engine 202, such as the engine 10 of FIG. 1, and may provide cooling to combustion chambers of the engine 202 by flowing a coolant through a water jacket or cooling sleeve, such as the cooling sleeve 118 of FIG. 1. The coolant may be glycol, an aqueous glycol solution, or some other type of coolant with a lower freezing point than water. The coolant system 200 has two distinct loops: a primary loop 204 that flows coolant through both an engine cooling loop 201 and a cabin heating loop 230, and a secondary loop 250 formed exclusively of the cabin heating loop 230. The engine cooling loop 201 includes components such as the engine 202, an engine oil cooler 206, an EGR cooler 208, and a radiator 210. The cabin heating loop 230 includes a positive temperature coefficient (PTC) heater 232, a heater core 234, and a HCIV 236. The primary loop 204 may be configured to both cool the engine 202 and provide heating to a passenger cabin of the PHEV when heating is requested and the engine 202 is operating. The secondary loop 250 may provide heating to the passenger cabin when the engine is not running and the PHEV is operating in an electric mode.

The engine cooling loop 201 includes a main pump 212 that drives coolant flow through the primary loop 204 via coolant line 214. The main pump 212 may be mechanically or electrically driven. For example, the coolant may flow from the pump 212 to the engine 202. After circulating through the engine 202 and extracting heat from the engine 202, the flow may be directed to a first three-way junction 216 that splits the flow of heated coolant based on feedback from a cylinder head temperature sensor 207. A first portion of coolant flow may be directed to the radiator 210, via coolant line 214, and a second portion directed to the EGR cooler 208, via coolant line 218. While operating in the primary coolant loop with coolant flowing through both the engine cooling loop and the cabin heating loop, the flow through the EGR cooler may be higher (such as 5 liters per minute) compared to a lower, negligible coolant flow (such as 0.01 liters per minute) through the EGR cooler when the coolant is solely circulated through the cabin heating loop.

The first portion of the coolant flow may flow through the radiator 210 where heat from the coolant may be transferred to the radiator 210. All or part of the heat recovered by the radiator 210 may be dissipated to the atmosphere. In some examples, the heat absorbed by the radiator 210 may be channeled to the passenger cabin to assist in warming the cabin. The first portion of the coolant flow may flow from the radiator 210 to a degas bottle 220 where the coolant may be de-aerated before returning to the main pump 212.

The second portion of the coolant flow may flow from the first three-way junction 216 to the EGR cooler 208 and extract heat from EGR gases flowing therethrough. When the PHEV is operating with the engine 202 running and flowing coolant through the primary coolant loop 204, the second portion of the coolant flow may continue from the EGR cooler 208 to the cabin heating loop 230, via coolant line 222. The coolant enters the cabin heating loop 230 at a second three-way junction 238 and flows via coolant line 240.

An auxiliary pump 242 may be positioned downstream of the second three-way junction 238, driving coolant flow through the cabin heating loop 230. The auxiliary pump 242 may be electrically or mechanically driven. Coolant is pumped to the PTC heater 232, which, as described above, may be an electric, self-regulating heater. When the PHEV engine 202 is operating and coolant is flowing through the primary loop 204, passenger cabin heating may be provided by heat extracted from the EGR gases at the EGR cooler 208. The coolant is already heated upon arrival at the PTC heater 232 and the PTC heater 232 is not activated. However, during engine cold starts, when the engine 202 is operating and coolant is flowing through the primary loop 204, the engine 202 may not be sufficiently warm to provide passenger cabin heating. The PTC heater 232 may be turned on to heat the coolant in the cabin heating loop 230 until the engine 202 reaches a threshold operating temperature, enabling the PTC heater 232 to be deactivated.

The first coolant loop temperature may be a temperature of coolant flowing through the engine cooling loop (also referred herein as first coolant loop) as estimated based on inputs from a cylinder head temperature sensor and/or a cylinder cooling sleeve temperature sensor, and the second coolant loop temperature is a temperature of coolant flowing through the cabin heating loop (also referred herein as second coolant loop), as estimated based on inputs of the coolant temperature sensor 244 housed in the cabin heating loop.

The coolant flows from the PTC heater 232 to the heater core 234. A coolant temperature sensor 244 may be arranged in the path of coolant flow between the PTC heater 232 and the heater core 234 to monitor a temperature of the coolant prior to interaction with the heater core 234. A temperature of coolant exiting the engine may be estimated based on output of the cylinder head temperature sensor 207 coupled to a cylinder cooling sleeve or a cylinder head. The cylinder head temperature sensor 207 may be coupled to the coolant line 214 downstream of engine 202 to estimate coolant temperature in the engine cooling loop. In one example, an engine coolant temperature may be inferred from the cylinder head temperature sensor 207 and used during a diagnostic. Rationality of the coolant temperature sensor 244 may be carried out to determine the robustness of the coolant system. For example, after a longer than threshold period of engine inactivity, a first difference between the cylinder head temperature sensor 207 and a second coolant loop temperature (e.g., coolant temperature sensor 244) may be compared to a threshold difference, a second difference between the second coolant loop temperature and ambient temperature may be compared to the threshold difference, and degradation of the coolant temperature sensor 244 may be indicated in response to one or both of the first difference and the second difference being higher than the threshold difference. Throughout the drive cycle, a status of the coolant temperature sensor 244 may be monitored by comparing the output of the coolant temperature sensor to an anticipated coolant temperature, and degradation of the coolant temperature sensor 244 may be detected in response to the output of the coolant temperature sensor being out of range of the anticipated temperature, the anticipated temperature modelled based on one or more of engine speed, engine load, first or second position of the HCIV 236, and the first coolant loop temperature.

The heater core 234 may be a heat exchange device that extracts heat from the coolant, transfers the heat to air, and directs the absorbed heat to the passenger cabin. For example, a blower may be arranged adjacent to the heater core 234, utilizing liquid-to-air heat exchange across the heater core 234 to funnel heated air into the passenger cabin. A temperature of the coolant emerging from the heater core 234 is therefore reduced relative to the coolant entering the heater core 234.

The cooled coolant flows from the heater core 234 to the HCIV 236. The HCIV 236 may be a valve that may be varied between at least two positions. For example, a non-limiting example of the HCIV 236 of FIG. 2 is shown in FIGS. 3A-3B arranged in a first position 300 in FIG. 3A and a second position 350 in FIG. 3B. The HCIV 236 may be implemented in the coolant system 200 of FIG. 2 and configured to alternate between directing coolant flow through the primary loop 204 and the secondary loop 250 of FIG. 2.

The HCIV 236 has a pivotable partition 304 that rotates about a hinge 306. Adjustment of the partition 304 between the first position 300 and the second position 350 may be actuated by an electric, electromagnetic, or hydraulic device, or some other type of actuating mechanism.

In the first position 300 shown in FIG. 3A, the partition 304 is oriented in an "open" position so that flow from the heater core 234 of FIG. 2 passes through the HCIV 236, as indicated by arrow 308, along a continuous path that fluidly couples the cabin heating loop 230 to the engine cooling loop 201 of FIG. 2, thereby flowing coolant through the primary loop 204. A solenoid in the HCIV may be de-energized to actuate the valve to the first, open position. The position of the partition 304 interrupts flow around the cabin heating loop 230 so that coolant is forced to divert along the direction indicated by arrow in the coolant line 246 to circulate through the engine cooling loop 201 of FIG. 2 before returning to the cabin heating loop 230. In the second position 350 shown in FIG. 3B, the partition 304 is pivoted in a clockwise, "closed" position, blocking flow from the heater core 234 to the engine cooling loop 201. The solenoid in the HCIV may be energized to actuate the valve to the second, closed position. Instead, coolant flows through the HCIV 236 as indicated by arrow 310 to continue circulating through the cabin heating loop 230, e.g., through the secondary loop 250.

Returning to FIG. 2, when the HCIV 236 is adjusted to a first position, e.g., the first position 300 of FIG. 3A, coolant may flow from the heater core 234, through the HCIV 236 and to the engine oil cooler 206 via coolant line 246 while blocking flow between the HCIV 236 and the second three-way junction 238 via line 248. Coolant flow may be driven by operation of the main pump 212 and the auxiliary pump 242 may be deactivated unless a speed of the main pump 212 drops below a threshold speed, e.g., the main pump 212 becomes degraded. Thus the coolant is forced to flow from the cabin heating loop 230 to the engine cooling loop 201 via coolant line 246 and from the engine cooling loop 201 to the cabin heating loop 230 via coolant line 222. The first position allows the engine cooling loop 201 and the cabin heating loop 230 to be combined and fluidly coupled. Alternatively, when adjusted to a second position, e.g., the second position 350 of FIG. 3B, coolant flow between the heater core 234 and the engine oil cooler 206 is inhibited and coolant instead flows through the HCIV 236 to the second three-way junction 238, via coolant line 248, confining coolant circulation within the cabin heating loop 230, via coolant line 240. In this position, the cabin heating loop 230 is isolated from the engine cooling loop 201 and coolant is circulated through the secondary loop 250 while the PHEV is operating in the electric mode and the engine 202 is not running.

During electric mode operation of the PHEV, cooling of the engine 202 and of EGR gases at the EGR cooler 208 may not be demanded or may be at least reduced. Flow between the EGR cooler 208 and the cabin heating loop 230 may therefore be discontinued without resulting in an increase in coolant temperature that may lead to thermal degradation of components of the engine cooling loop 201. The second portion of coolant, flowing from the engine 202 through the first three-way junction 216 and to the EGR cooler 208, may flow to the degas bottle 220, via coolant line 215, instead of to the cabin heating loop 230, via coolant line 222, when the HCIV 236 is in the second position.

As elaborated above, the HCIV 236 may be adjusted to the second position during electric mode operation, isolating the cabin heating loop 230 from the engine cooling loop 201. Flow through the cabin heating loop 230 is driven by operation of the auxiliary pump 242. The PTC heater 232 may be activated to heat the coolant as the coolant passes through. The heated transferred to the coolant from the PTC heater 232 is extracted from the coolant at the heater core 234, providing heat for warming the passenger cabin. In this way, the cabin heating loop 230 may heat the passenger cabin without relying on waste heat from the engine cooling loop 201.

If the HCIV 236 is degraded and becomes stuck in the second position, blocking coolant flow between the engine cooling loop 201 and the cabin heating loop 230 during engine operation when engine cooling is desired, the engine cooling loop 201 and the cabin heating loop 230 may remain isolated from one another. Further, without detection of a status of the HCIV 236, heated coolant may be forced to flow from the EGR cooler 208 to the degas bottle 220, via coolant line 215, which may alter a pressure of the degas bottle 220 and adversely affect an ability of the degas bottle 220 to maintain an air-free volume of coolant within the coolant system 200.

Furthermore, if the HCIV 236 is stuck in the second position, isolating the engine cooling loop 201 from the cabin heating loop 230, coolant circulating through the EGR cooler 208 may increase in temperature, reducing a capacity to cool EGR gases. Detection of insufficient cooling of EGR gases, by, for example a rise in intake manifold temperature, may lead to termination of EGR flow which may adversely affect emissions of the PHEV. Additionally, lack of heat extraction from the coolant via the cabin heating loop 230 may result in local boiling within the engine cooling loop 201 that may impose thermal stress on the EGR cooler 208. A status of the HCIV 236, e.g., whether the HCIV 236 is in the first or second position when coolant flow through the primary loop 204, e.g., when the cabin heating loop 230 and the engine cooling loop 201 are combined, is requested, may be passively and actively assessed. During an active monitoring of the HCIV 236, each of the main pump 212 and the auxiliary pump 242 may be activated, and the PTC heater 232 may be deactivated. Degradation of the HCIV 236 may be indicated in response to a first difference between the first coolant loop temperature and the second coolant loop temperature being higher than a first threshold during the active monitoring of the HCIV 236. After completion of the active monitoring of the coolant system valve, throughout the drive cycle, the first difference between the first coolant loop temperature, sensed by cylinder head temperature sensor 207, and the second coolant loop temperature, sensed by coolant temperature sensor 244, may be compared to a second threshold, and degradation of the HCIV 236 may be indicated in response to the first difference being higher than the second threshold, the second threshold different from the first threshold.

As will be described in greater detail below with respect to the method of FIG. 6, a condition of the auxiliary pump 242 may be diagnosed when conditions are met to execute a diagnostic. The auxiliary pump 242 may be commanded off and the cabin heating loop may be isolated (e.g., hermetically sealed) from the engine cooling loop 201 via actuation of HCIV 236. A temperature change of the coolant may be calculated based on feedback from the cylinder head temperature sensor 207 and the coolant temperature sensor 244. In one example, the diagnostic may include flowing the coolant to the heater core 234 when the diagnostic is executed in combination with a cabin heating request being present. The diagnostic may include commanding the auxiliary pump 242 on to determine if the auxiliary pump is stuck off. The auxiliary pump 242 may be stuck off if the temperature change is less than a threshold change. In one example, the temperature change may be calculated as an absolute value and the threshold change may be a dynamic value based on a temperature of coolant sensed at the cylinder head temperature sensor 207 and a coolant flow rate. Additionally or alternatively, the diagnostic may include commanding the auxiliary pump 242 off to determine if the auxiliary pump 242 is stuck on. The auxiliary pump may be stuck on if a temperature change of the coolant is greater than the threshold temperature change. The diagnostic may be passed (e.g., the auxiliary pump may not be stuck on) if the temperature change is equal to the threshold change.

If the diagnostic is executed when cabin heating is not desired, then cabin heating may be intrusively activated. In one example, cabin heating may be intrusively activated only in response to a passenger exiting the vehicle. Additionally or alternatively, if the diagnostic is executed when cabin heating is not desired, then coolant may flow to the PTC heater 232. The temperature change sensed by the diagnostic may be reversed relative to when cabin heating is activated. As such, if the pump is on, then the coolant temperature may be expected to increase after flowing through the PTC heater 232 compared to expecting the coolant temperature to decrease after flowing through the heater core 234.

Turning now to FIG. 4, it shows a schematic diagram of a coolant system 400 of a fully hybrid electric vehicle (FHEV). The FHEV may be differentiated from the PHEV in that the FHEV may not be recharged via shore power (e.g., a grid). Said another way, the FHEV may not be plugged in to recharge an energy storage device via a charging station or other similar device.

The coolant system 400 may be coupled to an engine 402, which may be identical to engine 10 of FIG. 1, and may provide cooling to combustion chamber of the engine 402 by flowing a coolant through a water jacket or cooling sleeve, such as the cooling sleeve 118 of FIG. 1. The coolant system 400 may include a single loop including an engine cooling loop 401 and a cabin heating loop 431. The engine cooling loop 401 may include one or more of the engine 402, an EGR cooler 424, and a radiator 410. The cabin heating loop 431 may include one or more of an auxiliary heater core 446, a primary heater core 450, and an exhaust gas heat recovery device 460.

The engine cooling loop 401 may include a pump 412 that directs coolant flow through the engine cooling loop 401 via various coolant lines. The various coolant lines may include an engine coolant line 414. The engine coolant line 414 may receive coolant expelled from the engine 402. The expelled coolant may flow to a first three-way junction 416 fluidly coupled to a continuation of the engine coolant line 414 and an EGR cooler line 422. In one example, the first three-way junction 416 is a three-way valve configured to adjust coolant flow to each of the engine coolant line 414 and the EGR cooler line 422 based on feedback from coolant cylinder head temperature sensor 406.

The engine coolant line 414 may conduct coolant to a second three-way junction 417 fluidly coupled to a continuation of the engine coolant line 414 and to a radiator bypass line 413. In one example, the second three-way junction 417 may be temperature actuated, wherein if cooling is desired, an actuator of the second three-way junction 417 may move to seal the radiator bypass line 413 and flow coolant to the engine coolant line 414. If cooling is not desired, then the actuator may seal the engine coolant line 414 and flow coolant through the radiator bypass line 413. It will be appreciated that the second three-way junction 417 may further include intermediate positions configured to flow coolant to each of the engine coolant line 414 and the radiator bypass line 413.

Coolant in the engine coolant line 414 may flow to the radiator 410. The radiator 410 may include a serpentine shape passage configured to conduct coolant therethrough. Coolant in the radiator may be air and/or liquid cooled prior to flowing to a continuation of the engine coolant line 414 coupled to a degas bottle 420. Additionally or alternatively, the radiator 410 may be fluidly coupled to a degas bottle bypass line 411. In one example, coolant may be directed to the degas bottle in response to an amount of air in the coolant, which may be determined based on a coolant temperature, a coolant pressure, a coolant compressibility, an oxygen concentration, and the like.

The degas bottle bypass line 411 may direct coolant from the radiator 410 to a valve 419. The valve 419 may be fluidly coupled to each of the radiator bypass line 413 and the degas bottle bypass line 411 and expel coolant from the lines to a first pump feed line 415. The first pump feed line 415 and the engine coolant line 414 receiving expelled coolant from the degas bottle 420 may be fluidly coupled to a four-way junction 418. The four-way junction 418 may be further coupled to a second pump feed line 462, which may direct coolant from an exhaust gas heat recovery device (EGHR) 460 to the four-way junction 418.

The four-way junction 418 may expel coolant to a continuation of the engine coolant line 414 fluidly coupled to a pump 412. The pump 412 may pressurize and direct coolant to a continuation of the engine coolant line 414 fluidly coupled to a coolant chamber of the engine 402. The coolant chamber may be a coolant jacket arranged in the engine block, such as cooling sleeve 118 of FIG. 1. Additionally or alternatively, the coolant jacket may be a coolant chamber arranged in the head.

The EGR cooler line 422 may direct coolant from the first three-way junction 416 to an EGR cooler 424. The EGR cooler 424 may be configured to transfer heat between the coolant and EGR flowing therethrough. In one example, this may result in a reduced temperature of EGR, which may decrease an engine temperature. The EGR cooler 424 may expel coolant to a degas bottle line 426 and/or to an EGHR line 428. The degas bottle line 426 may be fluidly coupled to the degas bottle 420, coolant therein may be aerated before returning to the engine coolant line 414. The EGHR line 428 may be fluidly coupled to a third three-way junction 430. The third three-way junction 430 may be fluidly coupled to a continuation of the EGHR line 428 and to a climate line 432. In one example, the third three-way junction 430 may be a three-way valve operated based on a cabin heating request, a coolant temperature, an exhaust gas temperature, and an engine temperature.

The climate line 432 may be fluidly coupled to a climate valve 440. The climate valve 440 may include a bypass section 442 and a feed section 444. Positions of the climate valve 440 may be adjusted via an actuator based on a cabin heating request and/or a coolant temperature. For example, a first position of the climate valve 440 may include where the bypass section 442 is open and the feed section 444 is closed. As such, coolant from the bypass section 442 may flow to an auxiliary heater core bypass line 434 toward a fourth three-way junction 435. As another example, a second position of the climate valve 440 may include where the bypass section 442 is closed and the feed section 444 is open. Coolant from the feed section 444 may flow to a continuation of the climate line 432 to an auxiliary heater core 446. The auxiliary heater core 446 may be configured to heat an interior cabin of a vehicle. In one example, air may be heated via coolant in the auxiliary heater core, wherein the heated air may be vented to the interior cabin. The auxiliary heater core 446 may expel coolant to a continuation of the climate line 432 fluidly coupled to the fourth three-way junction 435. In some example, the climate valve 440 may include positions between the first and second positions, wherein coolant may flow to each of the climate line 432 and the auxiliary heater core bypass line 434 based on an interior cabin heating demand. The fourth three-way junction 435 may direct coolant from the climate line 432 and the auxiliary heater core bypass line 434 to a continuation of the climate line 432 fluidly coupled to a fifth three-way junction 456.

The third three-way junction 430 may expel coolant to a continuation of the EGHR line 428 fluidly coupled to the heater core 450. The heater core 450 may be configured to heat the interior cabin, similar to the auxiliary heater core 446. Coolant expelled from the heater core 450 may flow through a continuation of the EGHR line 428 to the fifth three-way junction 456. Coolant at the fifth three-way junction 456 may be received from the EGHR line 428 downstream of the heater core 450 and the climate line 432 downstream of the fourth three-way junction 435. The fifth three-way junction 456 may flow coolant into a continuation of the EGHR line 428 to the EGHR 460. The EGHR 460 may be configured to transfer heat between exhaust gases and the coolant. In one example, the EGHR 460 is differentiated from the EGR cooler 424 in that exhaust gases flowing through the EGHR 460 are expelled to an ambient atmosphere or to an aftertreatment device and not to the engine. Coolant expelled from the EGHR 460 may flow through the second pump feed line 462, to the four-way junction 418, and to the pump 412. In this way, all coolant flowing through the cabin heating loop 431 returns to the pump 412 via the second pump feed line 462.

A first temperature sensor 464 may be positioned to sense a temperature of coolant upstream of the EGHR 460 and downstream of the fifth three-way junction 456, relative to a direction of coolant flow. A second temperature sensor 466 is positioned downstream of the EGHR 460. Each of the first and second temperature sensors may be configured to sense a temperature of coolant flowing through the EGHR line 428 and the second pump feed line 462, respectively.

As will be described in greater detail, a condition of the pump 412 may be determined during a diagnostic. In one example, the pump may be commanded off during the diagnostic. A temperature change of coolant may be measured based on temperatures sensed by the cylinder head temperature sensor 406, the first temperature sensor 464, and the second temperature sensor 466. In one example, an engine coolant temperature may be inferred based on feedback from the cylinder head temperature sensor 406 and used during the diagnostic. The temperature change may be compared to a threshold change to determine if the pump is stuck on or if the diagnostic is passed. Additionally or alternatively, the pump may be commanded on during the diagnostic to determine if the pump is stuck in an off position. The diagnostic of the pump of the second example of the coolant system 400 is described in greater detail below with respect to FIG. 7.

Turning now to FIG. 5A, it shows a plot 500 illustrating coolant temperatures with different operations of pump 412 of FIG. 4. Time is plotted along the abscissa and temperature is plotted along the ordinate. Plot 502 illustrates an engine coolant temperature sensed by a coolant temperature sensor positioned in the engine. Plot 504 illustrates a coolant temperature sensed by a sensor downstream of the heater core and upstream of the EGHR. In one example, plot 504 is inferred based on feedback from the cylinder head temperature sensor 406 of FIG. 4. Plot 506 illustrates feedback from the sensor between the heater core and the EGHR when the pump is activated. That is to say, the difference in temperature between plots 502 and 504 between times t1 and t2 may correspond to a desired temperature change when the pump is deactivated. Plot 502 and 504 may be based on feedback from first temperature sensor 464 of FIG. 4.

During a diagnostic, a threshold temperature change may be based on a difference between plots 502 and 504 or plots 502 and 506. If the diagnostic comprises where the pump is commanded off, then the threshold temperature change may be equal to the difference between plots 502 and 504. If the temperature change sensed during the diagnostic is greater than the threshold temperature change when the pump is commanded off, then the pump may be stuck on. If the pump is commanded on during the diagnostic, then the threshold temperature change may be equal to the different between plots 502 and 506. If the temperature change sensed during the diagnostic is less than the threshold temperature change when the pump is commanded on, then the pump may be stuck off.

Turning now to FIG. 5B, it shows a plot 550 illustrating coolant temperatures with different operations of auxiliary pump 242 of FIG. 2. Time is plotted along the abscissa and temperature is plotted along the ordinate. Plots 552, 554, and 556 illustrate coolant temperatures sensed by a temperature sensor positioned in a cabin heating loop. The plot 552 may correspond to a temperature sensed by a temperature sensor in the secondary coolant loop, such as coolant temperature sensor 244 of FIG. 2. Plots 554 and 556 may correspond to temperatures sensed by a coolant temperature sensor arranged in the cabin heating loop. Plot 554 may correspond to a temperature of the coolant in response to a cabin heating request being fulfilled. Plot 556 may correspond to a temperature of the coolant in response to the cabin heating request being absent and the PTC heater heating the coolant.

In one example, a condition of the auxiliary pump may be diagnosed via commanding the auxiliary pump on or off and comparing a temperature change of coolant to a threshold temperature change. If the pump is commanded off, then the threshold temperature change may be equal to a slope of plot 552 between t1 and t2. As illustrated, the slope may be relatively low such that the coolant temperature remains relatively constant and the temperature change thereof is relatively low. If the pump is commanded off and a slope of the sensed temperature is different than the threshold temperature, then the pump may be stuck on. If the pump is commanded on, then the threshold temperature change may be equal to a slope of plot 554 or 556 between t1 and t2. One of plots 554 or 556 may be selected based on a presence or an absence of a cabin heating request. For example, if cabin heating is requested, then the threshold temperature change may be equal to a difference between plots 556 and 552. If the cabin heating request is absent, then the threshold temperature change may be equal to a difference between plots 552 and 554. If the temperature change is not equal to the threshold temperature change when the pump is commanded on, then the diagnostic may determine that the pump is stuck off.

Turning to FIG. 5C, it shows a plot 580 illustrating a coolant temperature change for a coolant system. The plot 580 may be applicable to a plurality of vehicle arrangements including each of the examples of FIGS. 2 and 4. The plot 580 may be further applicable to gasoline, diesel, and hybrid vehicle systems having a coolant system. A temperature slope is plotted along the ordinate and time is plotted along the abscissa. The temperature slope may be based on a comparison between an engine coolant temperature and a coolant temperature of a secondary coolant loop including a cabin heater core.

The plot 582 may correspond to a temperature slope of the coolant in response to the pump operating as desired. Plot 584 illustrates a temperature slope of the coolant in response to the pump being stuck on. As illustrated, a magnitude of the temperature slope of plot 584 is greater than a magnitude of the temperature slope of plot 582. Plot 586 illustrates a temperature slope of the coolant in response to the pump being stuck off. As illustrated, a magnitude of the temperature slope of plot 586 is less than a magnitude of the temperature slope of plot 582. In one example, the temperature slope of plot 582 may be a threshold temperature slope used in a coolant diagnostic, wherein a sensed temperature slope may be compared to the threshold temperature slope to determine if a pump is degraded or operating as desired. Turning now to FIG. 6, it shows a method 600 for executing a coolant pump diagnostic in combination with the coolant systems of FIGS. 4 and 5A. Instructions for carrying out method 600 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 602, the method 600 may include determining current operating parameters. Current operating parameters may include one or more of throttle position, manifold pressure, engine temperature, engine speed, vehicle speed, and air/fuel ratio.

At 604, the method 600 may include determining if a cold-start is occurring. The cold-start may include where an engine temperature is less than a lower temperature of a desired engine temperature operating range. Additionally or alternatively, the cold-start may include where the engine temperature is less than an ambient temperature. If the cold-start is occurring, then at 606, the method 600 may include diverting coolant away from a secondary coolant loop.

In one example, the secondary coolant loop is a cabin heating loop. A valve may be adjusted to bypass a heater core, such as climate valve 440 of FIG. 4. Additionally or alternatively, an auxiliary pump may be deactivated.

The method 600 may continue to monitor if a cold-start is occurring. If a cold-start is not occurring, then at 608, the method 600 may include flowing coolant to both the engine coolant loop and the secondary coolant loop, which may include a heater core. In one example, coolant may flow to the heater core in response to only a cabin heating request. However, once the cold-start is complete, coolant may be permitted to flow to the heater core.

At 610, the method 600 may determine if the diagnostic is requested. The diagnostic may be requested in response to one or more of a threshold duration since a previous diagnostic test, a coolant temperature, a cabin temperature, and the like. The threshold duration may be based on an amount of time and/or a distance. The coolant temperature may signal a diagnostic request in response to the coolant temperature being greater than or less than a threshold coolant temperature. The cabin temperature may signal a diagnostic request in response to the cabin temperature being greater than or less than a threshold cabin temperature. In one example, the threshold cabin temperature is based on one or more of a magnitude of the cabin heating request, a number of vehicle occupants, an engine temperature, an ambient temperature, a vehicle speed, a window position, and starting cabin temperature.

If the diagnostic is not requested, then at 612, the method 600 may include maintaining flow to both the engine and the heater core.

If the diagnostic is requested, then at 614, the method 600 may include determining if the diagnostic conditions are met. In one example, the diagnostic conditions may include where an ambient temperature is less than a threshold ambient temperature and/or EGR is not active. The threshold ambient temperature may be based on an ambient temperature where cabin heating may be requested. In one example, the threshold ambient temperature is a fixed value (e.g., 45° F.). Additionally or alternatively, the threshold ambient temperature is a dynamic value, tailored to match vehicle operator preferences. For example, a first vehicle operator may request cabin heating at higher ambient temperatures than a second vehicle operator. The threshold ambient temperature may be a higher temperature for the first vehicle operator than for the second vehicle operator. EGR may not be active during the diagnostic due to reduced coolant flow to the EGR cooler. EGR flow to the EGR cooler during the diagnostic may result in thermal degradation of the EGR cooler.

In some examples, the diagnostic may be run during an after-run operation. The after-run operation may occur within a period of time following a vehicle off event. In one example, the period of time is 20 minutes, 10 minutes, 5 minutes, 3 minutes, 1 minute, or less following the vehicle off event. Executing the diagnostic during the after-run operation may further include where the vehicle operator exits the vehicle. A weight sensor may sense an absence of weight on the driver's seat. Additionally or alternatively, opening and closing of the driver door may signal the vehicle operator has exited the vehicle. The vehicle operator may signal a vehicle off request by turning an ignition key, depressing an ignition button, or using a mobile application wirelessly connected to the vehicle. Component temperatures may still be within desired operating ranges and the vehicle cabin may be intrusively heated without discomfort to the vehicle operator.

In one example, the diagnostic conditions may further include where the engine is unfueled. Thus, during the diagnostic, fuel injectors of the engine are deactivated and do not provide fuel thereto. Some conditions that may meet diagnostic conditions may include a start/stop, an all-electric mode, a coasting event, and a vehicle off.

If diagnostic conditions are not met, then at 615, the method 600 may include continuing to monitor diagnostic entry conditions.

If diagnostic conditions are met, then at 616, the method 600 may include closing the HCIV valve. In one example, closing the HCIV valve comprises adjusting a position of the valve to block coolant from flowing to the engine cooling loop and to continue flowing coolant through the cabin heating loop. In one example, the closed position of the HCIV is shown in FIG. 3B.

At 618, the method 600 may include activating the auxiliary pump. The controller may signal to an actuator of the auxiliary pump to conduct coolant flow through the cabin heating loop.

At 620, the method 600 may optionally include activating cabin heating or the PTC heater. In some examples, the method 600 may be executed passively if cabin heating or the PTC heater is already activated. If cabin heating is activated, then a temperature of the coolant may be reduced, as sensed by a temperature sensor of the cabin heating loop. If the PTC heater is activated, then a temperature of the coolant may be increased, as sensed by the temperature sensor of the cabin heating loop. The cabin heat state and the PTC heater status may be passively or actively monitored depending on the entry conditions of the diagnostic.

In one example, the diagnostic may not include where both cabin heating and the PTC heater are activated. Temperature changes caused by the heater core and the PTC may be negated, decreasing an accuracy of the diagnostic.

At 622, the method 600 may include measuring a coolant temperature change across the heater core and comparing the change to a threshold temperature change. The threshold temperature change may be adjusted based on monitored conditions, such as if cabin heating is activated or the PTC heater is activated. For example, the threshold temperature change may increase if the PTC heater is active. As another example, the threshold temperature change may decrease if cabin heating is active. When the pump is commanded on, the diagnostic may detect if the pump is in a stuck off position. The stuck off position may result in a relatively low coolant temperature change. Thus, if the pump is commanded on and coolant is directed to the heater core, then the threshold temperature change may correspond to a decrease in the coolant temperature. If the coolant is directed to the PTC, then the threshold temperature change may correspond to an increase in the coolant temperature.

At 624, the method 600 may include determining if the diagnostic is passed. The diagnostic may be passed if the temperature change is substantially equal to the threshold temperature change.

If the diagnostic is not passed, then at 628, the method 600 may include activating an indicator lamp and adjusting cabin heating loop operation (e.g., secondary loop operation) due to the pump being stuck off. In one example, adjusting operation of the cabin heating loop may include adjusting a position of the HCIV to a closed position to block coolant from entering the cabin heating loop.

If the diagnostic is passed and the pump is not stuck off, then at 628, the method 600 may include commanding the auxiliary pump off. Thus, the diagnostic proceeds to determine if the pump is stuck on.

At 630, the method 600 may optionally include activating cabin heating or the PTC heater, if not already passively activated, as described above at 620.

At 632, the method 600 may include measuring a coolant temperature change across the heater core and comparing the temperature change to a threshold temperature change. When the pump is commanded off, the threshold temperature change may be equal to a relatively low temperature change. The coolant may be expected to remain stagnant and stabilize in temperature rather than flowing through the PTC or the heater core where its temperature may be increased or decreased, respectively.

At 634, the method 600 may include determining if the diagnostic is passed. If the temperature change of the coolant is equal to the threshold temperature change, then the diagnostic is passed at 636. The pump is neither stuck on or off and is operating as desired. Operating parameters may be maintained.

If the temperature change of the coolant is different than the threshold temperature change, then at 638, the method 600 may include activating the indicator lamp and adjusting second loop operation due to the pump being stuck on. In one example, the PTC and the heater core may be deactivated when the pump is stuck on.

Turning now to FIG. 7, it shows a method 700 for executing a coolant pump diagnostic in combination with the coolant system 400 of FIG. 4 and plot 500 of FIG. 5A. At 702, the method 700 may include determining current operating parameters. Current operating parameters may include one or more of throttle position, manifold pressure, engine temperature, engine speed, vehicle speed, and air/fuel ratio.

At 704, the method may include determining if the engine is unfueled. The engine may be unfueled if a start/stop, an all-electric mode, an after-run, or a coasting event is occurring.

If the engine is fueled, then at 706, the method 700 may include not executing the diagnostic.

If the engine is unfueled, then at 708, the method 700 may include determining if a pump diagnostic is requested, similar to 610 of method 600. If the pump diagnostic is not requested, then the method 700 may proceed to 706 as described above.

If the pump diagnostic is requested, then at 710, the method 700 may optionally include intrusively activating cabin heating. In some examples, if cabin heating is already requested, then 710 may be skipped or adjusted to include intrusively increasing cabin heating. In some examples, additionally or alternatively, a prompt may be delivered to the vehicle operator notifying them of the adjustment to the cabin heating. The prompt may be displayed on a screen of an infotainment device, a smartphone, a tablet, a laptop, or other suitable device. By activating the cabin heating, a temperature change may be increased, resulting in greater confidence in the result of the diagnostic.

At 711, the method 700 may include commanding the pump on. The diagnostic may determine if a condition of the pump is stuck off or operating as desired.

At 712, the method 700 may include measuring a coolant temperature across the heater core. In one example, a temperature of coolant entering the heater core may be sensed via an engine temperature sensor and a temperature of coolant leaving the heater core may be sensed via a temperature sensor downstream of the heater core and upstream of the EGHR.

At 714, the method 700 may include comparing a temperature change across the heater core to a threshold temperature change. The temperature change may be equal to a difference between feedback from the temperature sensors upstream and downstream of the heater core. The threshold temperature change may be based on one or more of a cabin heating magnitude and an ambient temperature. For example, as the cabin heating magnitude increases, the threshold temperature change may also increase.

At 716, the method 700 may include determining if the diagnostic is passed. As described above with respect to FIG. 5A, when the pump is commanded on, the threshold temperature change may be based on a higher temperature change equal to the difference between a coolant temperature sensed at the engine and downstream of the heater core. If the temperature change is less than the threshold temperature change, then the pump may be stuck off and the diagnostic is not passage.

At 718, the method 700 includes determining the pump is stuck off in response to the temperature change of the coolant being less than the threshold temperature change.

At 720, the method 700 includes activating an indicator lamp. The method may further include adjusting engine operating parameters. Adjusting engine operating parameters may include adjusting an engine power output due to the pump being stuck off. In one example, the engine power output is reduced in response to the pump being stuck off.

If the temperature change is equal to the threshold temperature change, then the diagnostic is passed and at 722, the method 700 includes determining that the pump is not stuck off.

At 724, the method 700 may include commanding the pump off. The diagnostic may now determine if a condition of the pump includes the pump being stuck on.

At 726, the method 700 may include measuring a coolant temperature change across the heater core, similar to 712.

At 728, the method 700 may include comparing the temperature change to a threshold change, similar to 714. However, the threshold change at 728 may be different than the threshold change at 714. In one example, the threshold change at 728 may be based on a lower temperature change due to the pump being commanded off, therefore a temperature change of the coolant is expected to be relatively low.

At 730, the method 700 may include determining if the diagnostic is passed. If the temperature change is equal to the threshold temperature change, then the diagnostic is passed and the method 700 may include signaling the diagnostic is passed at 732. The indicator lamp may not be activated.

If the temperature change is greater than the threshold temperature change, then at 734, the method 700 may include determining the pump is stuck on. At 736, the method 700 may include activating an indicator lamp. The method may further include adjusting one or more operating parameters. For example, the auxiliary heater core may be bypassed until the pump diagnostic is passed and operating as desired.

Turning now to FIG. 8, it shows a method 800 for executing a coolant pump diagnostic in combination with the coolant system of FIG. 2 and plot 550 of FIG. 5B. Instructions for carrying out method 800 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 802, the method 800 may include determining current operating parameters. Current operating parameters may include one or more of throttle position, manifold pressure, engine temperature, engine speed, vehicle speed, and air/fuel ratio.

At 804, the method 800 may include determining if a cold-start is occurring. The cold-start may include where an engine temperature is less than a lower temperature of a desired engine temperature operating range. Additionally or alternatively, the cold-start may include where the engine temperature is less than an ambient temperature. If the cold-start is occurring, then at 806, the method 800 may include diverting coolant away from a secondary coolant loop.

In one example, the secondary coolant loop is a cabin heating loop. A valve may be adjusted to bypass a heater core, such as HCIV 236 of FIG. 2. Additionally or alternatively, an auxiliary pump may be deactivated.

The method 800 may continue to monitor if a cold-start is occurring. If a cold-start is not occurring, then at 808, the method 800 may include flowing coolant to both the engine coolant loop and the secondary coolant loop, which may include a heater core. In one example, coolant may flow to the heater core in response to only a cabin heating request. However, once the cold-start is complete, coolant may be permitted to flow to the heater core.

At 810, the method 800 may determine if the diagnostic is requested. The diagnostic may be requested in response to one or more of a threshold duration since a previous diagnostic test, a coolant temperature, a cabin temperature, and the like. The threshold duration may be based on an amount of time and/or a distance. The coolant temperature may signal a diagnostic request in response to the coolant temperature being greater than or less than a threshold coolant temperature. The cabin temperature may signal a diagnostic request in response to the cabin temperature being greater than or less than a threshold cabin temperature. In one example, the threshold cabin temperature is based on one or more of a magnitude of the cabin heating request, a number of vehicle occupants, an engine temperature, an ambient temperature, a vehicle speed, a window position, and starting cabin temperature.

If the diagnostic is not requested, then at 812, the method 800 may include maintaining flow to both the engine and the heater core.

If the diagnostic is requested, then at 814, the method 800 may include determining if the diagnostic conditions are met. In one example, the diagnostic conditions may include where an ambient temperature is less than a threshold ambient temperature and/or EGR is not active. The threshold ambient temperature may be based on an ambient temperature where cabin heating may be requested. In one example, the threshold ambient temperature is a fixed value (e.g., 45° F.). Additionally or alternatively, the threshold ambient temperature is a dynamic value, tailored to match vehicle operator preferences. For example, a first vehicle operator may request cabin heating at higher ambient temperatures than a second vehicle operator. The threshold ambient temperature may be a higher temperature for the first vehicle operator than for the second vehicle operator. EGR may not be active during the diagnostic due to reduced coolant flow to the EGR cooler. EGR flow to the EGR cooler during the diagnostic may result in thermal degradation of the EGR cooler.

In some examples, the diagnostic may be run during an after-run operation. The after-run operation may occur within a period of time following a vehicle off event. In one example, the period of time is 20 minutes, 10 minutes, 5 minutes, 3 minutes, 1 minute, or less following the vehicle off event. Executing the diagnostic during the after-run operation may further include where the vehicle operator exits the vehicle. A weight sensor may sense an absence of weight on the driver's seat. Additionally or alternatively, opening and closing of the driver door may signal the vehicle operator has exited the vehicle. The vehicle operator may signal a vehicle off request by turning an ignition key, depressing an ignition button, or using a mobile application wirelessly connected to the vehicle. Component temperatures may still be within desired operating ranges and the vehicle cabin may be intrusively heated without discomfort to the vehicle operator.

In one example, the diagnostic conditions may further include where the engine is unfueled. Thus, during the diagnostic, fuel injectors of the engine are deactivated and do not provide fuel thereto. Some conditions that may meet diagnostic conditions may include a start/stop, an all-electric mode, a coasting event, and a vehicle off.

If diagnostic conditions are not met, then at 815, the method 800 may include continuing to monitor diagnostic entry conditions.

If diagnostic conditions are met, then at 816, the method 800 may include closing the HCIV valve. In one example, closing the HCIV valve comprises adjusting a position of the valve to block coolant from flowing to the engine cooling loop and to continue flowing coolant through the cabin heating loop. In one example, the closed position of the HCIV is shown in FIG. 3B.

At 818, the method 800 may include commanding the pump ON. The controller may signal to an actuator of the pump to conduct coolant flow through the isolated loop.

At 820, the method 800 may include passively monitoring the cabin heat state and PTC heater status.

In one example, the diagnostic may not include where both cabin heating and the PTC heater are activated. Temperature changes caused by the heater core and the PTC may be negated, decreasing an accuracy of the diagnostic.

At 822, the method 800 may include measuring a coolant temperature change in the isolated loop and comparing the change to a threshold temperature change. The threshold temperature change may be adjusted based on monitored conditions, such as if cabin heating is activated or the PTC heater is activated. For example, the threshold temperature change may increase if the PTC heater is active. As another example, the threshold temperature change may decrease if cabin heating is active. When the pump is commanded on, the diagnostic may detect if the pump is in a stuck off position. The stuck off position may result in a relatively low coolant temperature change. When the pump is commanded on and coolant is directed to the heater core, then the threshold temperature change may correspond to a decrease in the coolant temperature. If the coolant is directed to the PTC, then the threshold temperature change may correspond to an increase in the coolant temperature.

At 824, the method 800 may include determining if the diagnostic is passed. The diagnostic may be passed if the temperature change is substantially equal to the threshold temperature change.

If the diagnostic is not passed, then at 828, the method 800 may include activating an indicator lamp and adjusting cabin heating loop operation (e.g., secondary loop operation) due to the pump being stuck off. In one example, adjusting operation of the cabin heating loop may include adjusting a position of the HCIV to a closed position to block coolant from entering the cabin heating loop.

If the diagnostic is passed and the pump is not stuck off, then at 828, the method 800 may include commanding the auxiliary pump off. Thus, the diagnostic proceeds to determine if the pump is stuck on.

At 830, the method 800 may include passively monitoring the cabin heat state and PTC heater status.

At 832, the method 800 may include measuring a coolant temperature change in the isolated loop and comparing the temperature change to a threshold temperature change. When the pump is commanded off, the threshold temperature change may be equal to a relatively low temperature change. The coolant may be expected to remain stagnant and stabilize in temperature rather than flowing through the PTC or the heater core where its temperature may be increased or decreased, respectively.

At 834, the method 800 may include determining if the diagnostic is passed. If the temperature change of the coolant is equal to the threshold temperature change, then the diagnostic is passed at 836. The pump is neither stuck on or off and is operating as desired. Operating parameters may be maintained.

If the temperature change of the coolant is different than the threshold temperature change, then at 838, the method 800 may include activating the indicator lamp and adjusting second loop operation due to the pump being stuck on. In one example, the PTC and the heater core may be deactivated when the pump is stuck on.

Turning now to FIG. 9, it shows a method 900 for executing a coolant pump diagnostic in combination with the coolant system 200 of FIG. 2 and plot 550 of FIG. 5B. At 902, the method 900 may include determining current operating parameters. Current operating parameters may include one or more of throttle position, manifold pressure, engine temperature, engine speed, vehicle speed, and air/fuel ratio.

At 904, the method may include determining if the engine is unfueled. The engine may be unfueled if a start/stop, an all-electric mode, an after-run, or a coasting event is occurring.

If the engine is fueled, then at 906, the method 900 may include not executing the diagnostic.

If the engine is unfueled, then at 908, the method 900 may include determining if a pump diagnostic is requested, similar to 810 of method 800. If the pump diagnostic is not requested, then the method 900 may proceed to 906 as described above.

If the pump diagnostic is requested, then at 910, the method 900 may include intrusively activating the PTC heater. The controller may signal to activate the PTC heater in order to execute the diagnostic and not in response to a different condition, such as a cold-start occurring or the like.

At 911, the method 900 may include commanding the pump on. The diagnostic may then determine if a condition of the pump is stuck off or operating as desired.

At 912, the method 900 may include measuring a coolant temperature in the isolated loop. In one example, the coolant temperature may be sensed via a coolant temperature sensor arranged in the secondary loop.

At 914, the method 900 may include comparing a temperature change across the heater core to a threshold temperature change. The temperature change may be equal to a difference between feedback from the temperature sensors upstream and downstream of the heater core. The threshold temperature change may be based on one or more of a cabin heating magnitude and an ambient temperature. For example, as the cabin heating magnitude increases, the threshold temperature change may also increase.

At 916, the method 900 may include determining if the diagnostic is passed. As described above with respect to FIG. 5B, when the pump is commanded on, the threshold temperature change may be based on a higher temperature change equal to the difference between a coolant temperature sensed at the engine and downstream of the heater core. If the temperature change is less than the threshold temperature change, then the pump may be stuck off and the diagnostic is not passage.

At 918, the method 900 includes determining the pump is stuck off in response to the temperature change of the coolant being less than the threshold temperature change.

At 920, the method 900 includes activating an indicator lamp. The method may further include adjusting engine operating parameters. Adjusting engine operating parameters may include adjusting an engine power output due to the pump being stuck off. In one example, the engine power output is reduced in response to the pump being stuck off.

If the temperature change is equal to the threshold temperature change, then the diagnostic is passed and at 922, the method 900 includes determining that the pump is not stuck off.

At 924, the method 900 may include commanding the pump off. The diagnostic may now determine if a condition of the pump includes the pump being stuck on.

At 926, the method 900 may include measuring a coolant temperature change in the isolated, secondary loop, similar to 912. As such, the HCIV is commanded to the closed position via a signal from a controller to an actuator thereof.

At 928, the method 900 may include comparing the temperature change to a threshold change, similar to 914. However, the threshold change at 928 may be different than the threshold change at 914. In one example, the threshold change at 928 may be based on a lower temperature change due to the pump being commanded off, therefore a temperature change of the coolant is expected to be relatively low.

At 930, the method 900 may include determining if the diagnostic is passed. If the temperature change is equal to the threshold temperature change, then the diagnostic is passed and the method 900 may include signaling the diagnostic is passed at 932. The indicator lamp may not be activated.

If the temperature change is greater than the threshold temperature change, then at 934, the method 900 may include determining the pump is stuck on. At 936, the method 900 may include activating an indicator lamp. The method may further include adjusting one or more operating parameters. For example, the auxiliary heater core may be bypassed until the pump diagnostic is passed and operating as desired.

In this way, a pump diagnostic may be executed without a specially designed chip. By excluding the chip, manufacturing costs may be reduced. Furthermore, manufacturing delays due to chip shortages may be avoided. The technical effect of diagnosing the pump via monitoring a temperature change is to ensure a desired operation of the pump while decreasing manufacturing costs thereof.

The disclosure also provides support for a method, comprising: diagnosing a coolant pump based on only a temperature change of a coolant across a heater core. In a first example of the method, the coolant pump is the only coolant pump of an engine system. In a second example of the method, optionally including the first example, the coolant pump is a secondary coolant pump arranged in a cabin heating circuit of an engine system, and wherein a primary coolant pump is arranged in an engine cooling loop. In a third example of the method, optionally including one or both of the first and second examples, the method further comprises: deactivating the primary coolant pump when diagnosing the secondary coolant pump. In a fourth example of the method, optionally including one or more or each of the first through third examples, the method further comprises: diagnosing the coolant pump in response to an ambient temperature being less than a threshold temperature, wherein the threshold temperature is based on a likelihood of cabin heating being desired. In a fifth example of the method, optionally including one or more or each of the first through fourth examples, the method further comprises: diagnosing the coolant pump in response to exhaust gas recirculation not being desired. In a sixth example of the method, optionally including one or more or each of the first through fifth examples, the method further comprises: diagnosing the coolant pump in response to an engine being unfueled. In a seventh example of the method, optionally including one or more or each of the first through sixth examples, the method further comprises: diagnosing the coolant pump in response to an after run occurring, wherein the after run occurs for a threshold duration following a vehicle off event.

The disclosure also provides support for a system including a pump configured to pump coolant to an engine heating circuit and a cabin heating circuit, wherein the pump is the only pump, and a controller with computer-readable instructions stored on non-transitory memory thereof that when executed enable the controller to execute a diagnostic of the pump by activating cabin heating and sensing a temperature change of the coolant across a heater core in response to a cold-start not occurring and the diagnostic being requested. In a first example of the system, the instructions further enable the controller to determine the pump is stuck off in response to the temperature change being less than a threshold temperature change. In a second example of the system, optionally including the first example, the instructions further enable the controller to reduce an engine power output in response to the pump being stuck off. In a third example of the system, optionally including one or both of the first and second examples, the instructions further enable the controller to determine the pump is stuck on in response to the temperature change being greater than a threshold temperature change. In a fourth example of the system, optionally including one or more or each of the first through third examples, activating cabin heating comprises activating cabin heating in response to a cabin heating request. In a fifth example of the system, optionally including one or more or each of the first through fourth examples, activating cabin heating comprises intrusively activating cabin heating in response to a cabin heating request being absent. In a sixth example of the system, optionally including one or more or each of the first through fifth examples, the temperature change is based on a coolant temperature sensed by an engine coolant temperature sensor and a temperature sensor downstream of a heater core relative to a direction of coolant flow.

The disclosure also provides support for a method for an engine system comprising a main pump and a secondary pump arranged in a coolant system, the method, including deactivating the main pump, deactivating the secondary pump, and monitoring a temperature change of coolant in a cabin heating loop of the coolant system to diagnose a condition of the secondary pump. In a first example of the method, the condition of the secondary pump is stuck on in response to the temperature change is greater than a threshold temperature change. In a second example of the method, optionally including the first example, the cabin heating loop is isolated from a remainder of the coolant system when the condition of the secondary pump is being diagnosed via actuation of a valve. In a third example of the method, optionally including one or both of the first and second examples, the temperature change is based on flowing coolant to either a coolant heater or a heater core, wherein coolant is directed to the heater core in response to a cabin heating request being present. In a fourth example of the method, optionally including one or more or each of the first through third examples, the method further comprises: activating the secondary pump and monitoring the temperature change of coolant in the cabin heating loop of the coolant system to diagnose if the secondary pump is stuck off.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   determining a temperature change of a coolant across a heater core based on sensor data, including based on temperature of coolant entering the heater core and temperature of coolant leaving the heater core; and
   diagnosing a coolant pump based on only the temperature change, wherein the coolant pump is positioned in a hybrid vehicle cooling system including one or more of an engine cooling system and a cabin cooling system, the hybrid vehicle including an engine.

2. The method of claim 1, wherein the coolant pump is the only coolant pump of an engine system.

3. The method of claim 1, wherein the coolant pump is a secondary coolant pump arranged in a cabin heating loop of an engine system, and wherein a main coolant pump is arranged in an engine cooling loop.

4. The method of claim 3, further comprising deactivating the main coolant pump when diagnosing the secondary coolant pump.

5. The method of claim 1, further comprising diagnosing the coolant pump in response to an ambient temperature being less than a threshold temperature.

6. The method of claim 1, further comprising diagnosing the coolant pump in response to exhaust gas recirculation not being desired.

7. The method of claim 1, further comprising diagnosing the coolant pump in response to an engine being unfueled.

8. The method of claim 1, further comprising diagnosing the coolant pump in response to an after run occurring, wherein the after run occurs for a threshold duration following a vehicle off event.

9. A system, comprising:
   a pump configured to pump coolant to an engine heating loop and a cabin heating loop, wherein the pump is the only pump of the system; and
   a controller with computer-readable instructions stored on non-transitory memory thereof that when executed enable the controller to:

execute a diagnostic of the pump by activating cabin heating and sensing a temperature change of the coolant across a heater core in response to a cold-start not occurring and the diagnostic being requested, wherein the sensed temperature change is based on sensed temperature of coolant entering the heater core and sensed temperature of coolant leaving the heater core.

10. The system of claim 9, wherein the instructions further enable the controller to determine the pump is stuck off in response to the temperature change being less than a threshold temperature change.

11. The system of claim 10, wherein the instructions further enable the controller to reduce an engine power output in response to the pump being stuck off.

12. The system of claim 9, wherein the instructions further enable the controller to determine the pump is stuck on in response to the temperature change being greater than a threshold temperature change.

13. The system of claim 9, wherein activating cabin heating comprises activating cabin heating in response to a cabin heating request.

14. The system of claim 9, wherein activating cabin heating comprises intrusively activating cabin heating in response to a cabin heating request being absent.

15. The system of claim 9, wherein the temperature change is based on a coolant temperature sensed by an engine coolant temperature sensor and a temperature sensor downstream of a heater core relative to a direction of coolant flow.

16. A method for an engine system comprising a main pump and a secondary pump arranged in a coolant system, the method, comprising:
deactivating the main pump;
deactivating the secondary pump; and
monitoring a temperature change of coolant in a cabin heating loop of the coolant system to diagnose a condition of the secondary pump, the temperature change based on a coolant temperature sensed by an engine coolant temperature sensor and a temperature sensor downstream of a heater core relative to a direction of coolant flow.

17. The method of claim 16, wherein the condition of the secondary pump is stuck on in response to the temperature change being greater than a threshold temperature change.

18. The method of claim 16, wherein the cabin heating loop is isolated from a remainder of the coolant system when the condition of the secondary pump is being diagnosed via actuation of a valve.

19. The method of claim 16, wherein the temperature change is based on flowing coolant to either a coolant heater or a heater core, wherein coolant is directed to the heater core in response to a cabin heating request being present.

20. The method of claim 16, further comprising activating the secondary pump and monitoring the temperature change of coolant in the cabin heating loop of the coolant system to diagnose if the secondary pump is stuck off.

* * * * *